(12) United States Patent
Torii et al.

(10) Patent No.: US 6,644,858 B2
(45) Date of Patent: Nov. 11, 2003

(54) WHEEL BEARING DEVICE

(75) Inventors: Akira Torii, Iwata (JP); Shigeaki Fukushima, Iwata (JP); Akio Sakaguchi, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/136,294

(22) Filed: May 2, 2002

(65) Prior Publication Data

US 2002/0118899 A1 Aug. 29, 2002

Related U.S. Application Data

(62) Division of application No. 09/658,271, filed on Sep. 8, 2000, now Pat. No. 6,406,186.

(30) Foreign Application Priority Data

| Sep. 9, 1999 | (JP) | ............................................. 11-255907 |
| Sep. 10, 1999 | (JP) | ........................................... 11-257710 |
| Jan. 20, 2000 | (JP) | ......................................... 2000-11347 |

(51) Int. Cl.$^7$ .............................................. F16C 19/08
(52) U.S. Cl. ...................................................... 384/448
(58) Field of Search ................................. 384/448, 446, 384/544; 324/174, 173

(56) References Cited

U.S. PATENT DOCUMENTS

| 5,816,711 A | 10/1998 | Gingrich |
| 6,109,793 A | 8/2000 | Miyazaki |
| 6,280,093 B1 * | 8/2001 | Ohtsuki et al. .............. 384/448 |

* cited by examiner

Primary Examiner—Lenard A. Footland
(74) Attorney, Agent, or Firm—Arent Fox Kintner Plotkin & Kahn, PLLC

(57) ABSTRACT

A wheel bearing device comprises a rotor having a double row of raceway surfaces and having a wheel fixed thereto, an outer ring having a double row of raceway surfaces and a flange to be fixed to a knuckle disposed on the car body side, and a double row of rolling bodies interposed between the respective raceway surfaces of the rotor and outer ring. A pulser ring is disposed between the double row of raceway surfaces of the rotor, and a sensor opposed to the pulser ring is held by a holding member held between the flange of the outer ring and the knuckle, whereby the sensor can be disposed in the bearing inner space.

10 Claims, 21 Drawing Sheets

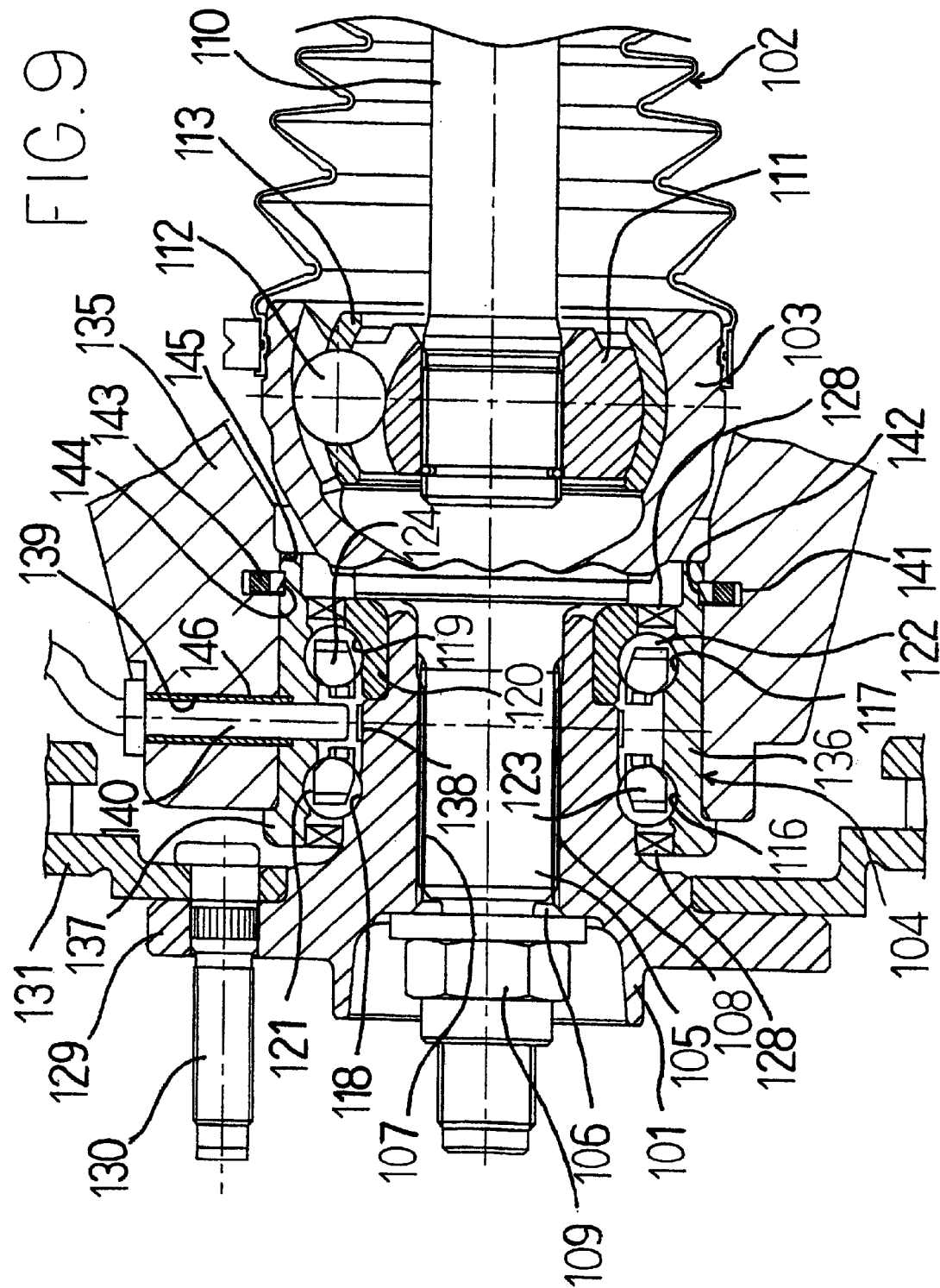

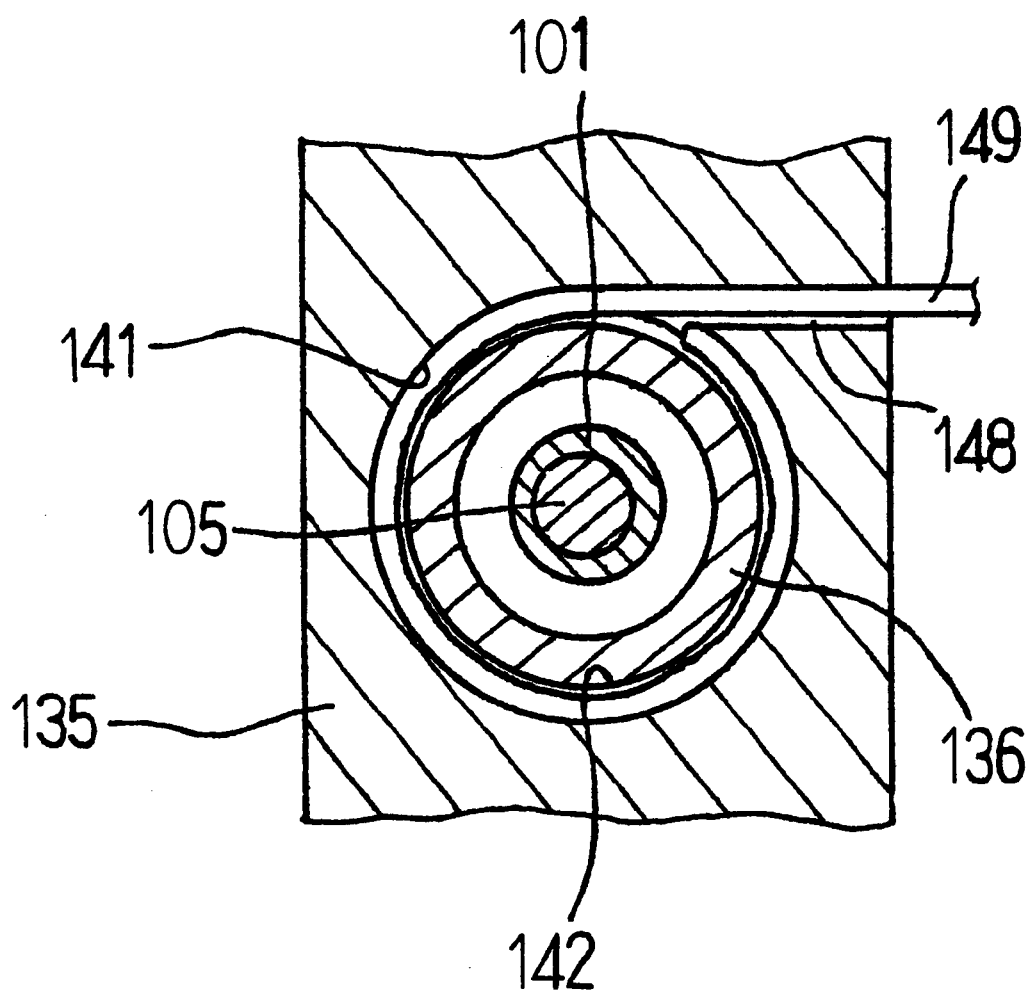

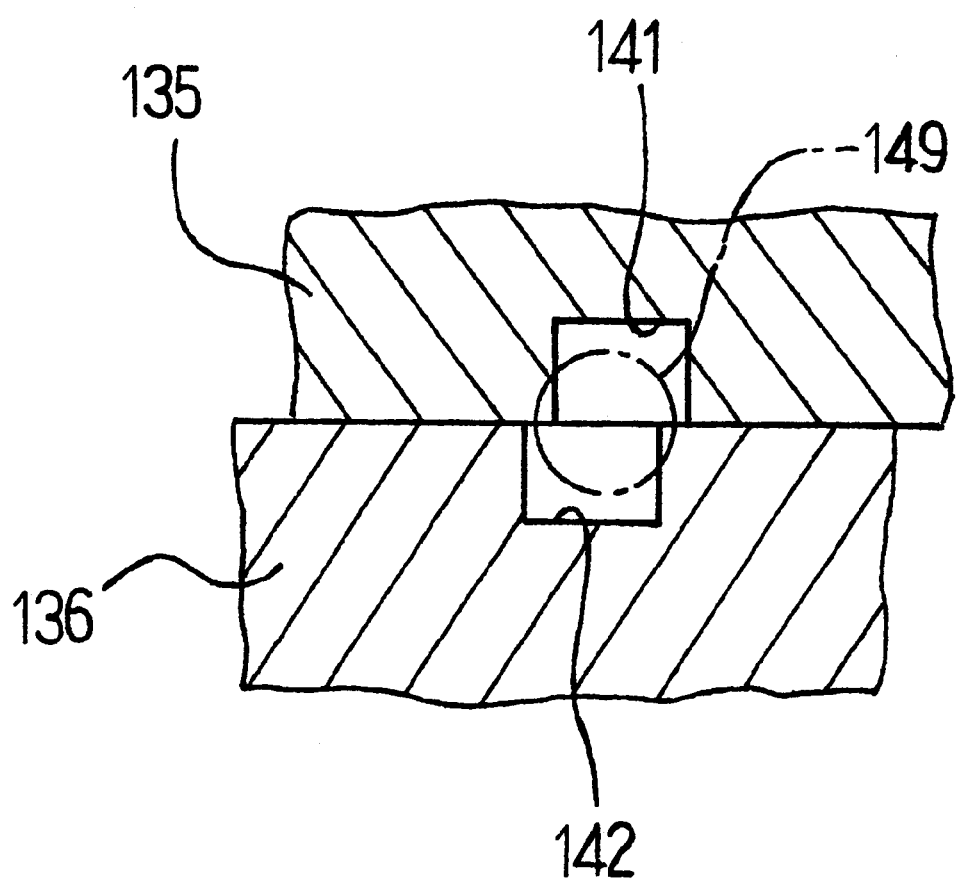

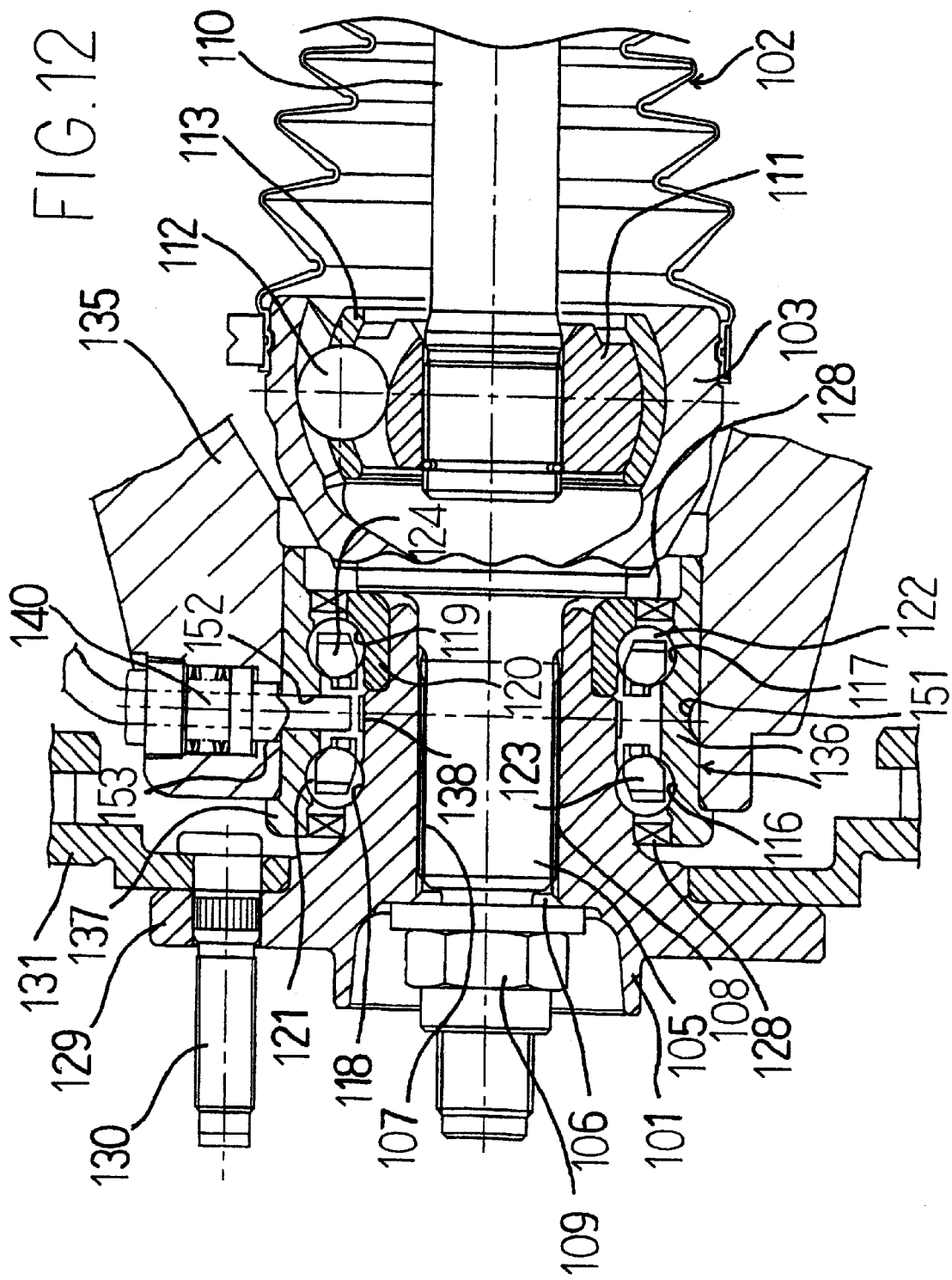

WHEEL BEARING DEVICE

This is a Division of application Ser. No. 09/658,271, U.S. Pat. No. 6,406,186 filed Sep. 8, 2000. The disclosure of the prior application is hereby incorporated by reference herein in its entirety.

BACKGROUND OF THE INVENTION

1. Filed of the Invention

The present invention relates to a wheel bearing device (hub bearing) used in automobiles, etc., particularly to a wheel bearing device having unitarily built therein a wheel speed detection means for an ABS (antilock brake system).

2. Prior Art

A wheel bearing device, as shown in FIG. 6, comprises a hub ring 1, an inner ring 2, a double row of rolling bodies 3, and an outer ring 4. The outer peripheral surface of the hub ring 1 is formed with a wheel attaching flange 1a for fixing a wheel at the outboard end, and a first raceway surface 5a in the intermediate region. The inboard end of the hub ring 1 is formed with a small-diametered stepped portion 1b having a reduced outer diameter, and the inner ring 2 formed with a second raceway surface 5b on its outer peripheral surface is fitted on the small-diametered stepped portion 1b. The inner peripheral surface of an outer ring 4 is formed with a double row of raceway surfaces 6 opposed to the first and second raceway surfaces 5a and 5b, and a double row of rolling bodies 3 are installed between the first and second raceway surfaces 5a, 5b and the double row of raceway surfaces 6. The outer ring 4 is fixed to an unillustrated suspension device through a flange 4a formed on the outer peripheral surface.

As for a design in which a wheel speed detecting means for ABS is built in this wheel bearing device, there is known an arrangement wherein, as shown in the same figure, a pulser ring 7 serving as a pulse generator is installed between the first and second raceway surfaces 5a and 5b on the outer peripheral surface of the hub ring 1 and a sensor 8 serving as a pulse detector extends through the outer ring 4 to be opposed to the pulser ring 7.

When the assembly of the wheel bearing device is to be assembled in a car body, normally, of the outer peripheral surface of the outer ring 4, the inboard side of the flange 4a is inserted in the inner peripheral surface of an attaching member (knuckle) extending from a suspension device. However, in the case where the flange 4a is deviated to the outboard side of the outer ring 4, as shown, the outer peripheral surface of the outer ring is covered by the knuckle in many axial regions, so that as it stands the ABS sensor 8 interferes with the knuckle, making the insertion impossible. Therefore, the attached position of the ABS sensor 8 has to be reconsidered, but it is not easy to secure a space for attachment, particularly it is considerably difficult to arrange the sensor 8 in the bearing inner space (the space between the double row of rolling bodies 3).

SUMMARY OF THE INVENTION

Accordingly, an object of the invention is to provide a wheel bearing device that makes it possible to install an ABS sensor even if the flange of the outer ring is deviated to the outboard side.

A wheel bearing device according to an embodiment of the invention comprises a rotor having a double row of raceway surfaces and adapted to have a wheel fixed thereto, a stator having a double row of raceway surfaces and a flange for fixing to an attaching member on the car body side, and a double row of rolling bodies interposed between the respective raceway surfaces of the rotor and stator, the wheel being rotatably supported on the car body, wherein installed between said double row of raceway surfaces of the rotor is a sensed part, and a sensor opposed to said sensed part is held by a holding member held between said flange of the stator and said attaching member.

According to the invention, even when the flange of the stator is deviated to the outboard side, a wheel rpm detection means can be added to the wheel bearing device; particularly, it can be easily disposed in the bearing inner spacer which is advantageous for the operating stability of the sensor. Further, the wheel bearing device may be unitized (modularized) in a form that includes the attaching members on the car body side and the operability in assembling the wheel bearing device in the car body is improved. Specifically, since the holding member is thus interposed between the flange of the stator and the attaching member, such as a knuckle, to hold the sensor, then the sensor can be easily disposed in the bearing inner space even if the flange of the stator is in a position deviated to the outboard side. Since the bearing inner space is a sealed space whose opposite ends are sealed, the sensed part and the sensor can be protected from dust, salt water, stones, etc., and stabilized detection of speed becomes possible. Further, the wheel bearing device can be unitized in a form that includes the attaching member, and the operability in assembling the wheel bearing device and attaching it to the car body is improved.

The rotor may include, for example, a hub ring and an inner ring fitted in the hub ring. In this case, one of the double row of raceway surfaces of the rotor may be formed in the hub ring and the other in the inner ring.

Further, the rotor may include a hub ring and the outer joint member of a constant velocity joint connected to the hub ring. This arrangement is suitable as a wheel bearing device for driving wheels. In this case, one of the double row of raceway surfaces of the rotor may be formed in the hub ring and the other in the outer joint member of the constant velocity joint.

The hub ring and the outer joint member may be fitted together and crimped by at least locally expanding or contracting the diameter of the fitting portions, thereby preventing them from loosening so that they can be reliably joined together.

The flange of the stator, holding member, and the attaching member disposed on the car body side are joined together as by bolts. In this case, if the holding member is made of resin and the periphery of the bolt hole is made of metal, then weight reduction can be attained and even when the knuckle is made of aluminum alloy, the presence of the resin in the interface between the steel and the aluminum prevents the steel members (the stator, etc.) from rusting due to the difference in ionization tendency.

The present invention has for its another object the provision of a wheel bearing device that dispenses with the bolting of the outer ring to the knuckle, reduces the number of parts, the number of man-hours of assembly, and the number of man-hours needed to process the outer ring, and readily realizes light weight and size compaction.

A wheel bearing device according to another embodiment of the invention comprises a fixed member attached to a car body, an outer member fitted in the fixed member and formed with a double row of raceway surfaces on its inner periphery, an inner member formed with a double row of raceway surfaces on its outer peripheral surface opposed to the raceway surfaces of the outer member and having a wheel attaching flange, a double row of rolling bodies interposed between the raceway surfaces of the outer and inner members, the wheel being rotatably supported by the car body, the wheel bearing device being characterized in that an speed detecting sensor is fitted in a hole formed to extend radially through the fixed and outer members and is opposed to a sensed part disposed between the raceway surfaces of the inner member.

In the wheel bearing device, the speed detecting sensor is fitted in the hole formed to extend radially through the fixed and outer members and is opposed to a sensed part disposed between the raceway surfaces of the inner member; this eliminates the need for forming a car body attaching flange on the outer periphery of the outer member and bolting it to the knuckle, making it possible to realize light weight and cost reduction by an amount corresponding to at least the bolts, making it easier to attain light weight and cost reduction since there is no need to form the flange, allowing unitization (modularization), cutting down on the operation of attachment to the car body. Thus, it is possible to reduce the number of parts, the number of man-hours of assembly, the number of man-hours needed to process the outer ring of the bearing, and to realize light weight and size compaction for the entire device, the practical value of the invention being high.

The sensor may be fitted in the hole in the fixed and outer members through a cylindrical member, so that the strength of the sensor itself can be improved and even if there is no allowance for tightening the outer member fitted in the fixed member, creeping of the outer member can be prevented by the sensor.

A construction in which a pin-like member is fitted in a hole formed to extend radially through the fixed and outer members or a construction in which a pin-like member is fitted in a hole formed to extend radially through the fixed member and is engaged in an annular groove formed in the outer surface of the outer member, may be employed, then the outer member can be axially positioned and fixed, it being also possible to prevent the outer member from creeping.

The pin-like member may be fitted in the hole in the fixed member through an elastic member so that the pin-like member can be projected and retracted and it can be engaged in the annular groove of the outer member by a predetermined urging force. In this case, the pin-like member can be fitted in the fixed member in advance by deformation of the elastic member, improving the assembling operation and, if the sensor is removed, the outer member can be withdrawn with a predetermined axial load applied thereto.

The inner surface of the fixed member and the outer surface of the outer member may be formed with an annular groove and a locking member is installed that bites into the annular grooves, so that the outer member can be axially positioned and fixed. In addition, the locking member may preferably be in the form of a diametrically contractible end-having snap ring having elastic recovery force. The snap ring may be made circumferentially uneven, so that the outer member can be prevented from axial playing.

An alternative arrangement for axially positioning the outer member may be such that the inner surface of the fixed member and the outer surface of the outer member are each formed with an annular groove, a tangential hole communicating with the annular grooves is formed in the fixed member, and a locking member is installed that is inserted from the tangential hole and bites into the annular grooves. In addition, the locking member may preferably be a wire or bearing steel ball inserted from the tangential hole communicating with the annular groove of the fixed member.

The present invention has for its other object to simplify the attaching operation of such wheel bearing device, to reduce the number of parts and the number of man-hours of assembly, to increase the operating stability of the wheel speed detecting means, etc.

A wheel bearing device according to other embodiment of the invention comprises rotary raceway surfaces formed in a double row in a rotor rotating together with a wheel, fixed raceway surfaces formed in a double row on the car body side, a double row of rolling bodies interposed between the rotary raceway surfaces and the fixed raceway surfaces, the wheel being supported for rotation with respect to an attaching member extending from the car body, wherein the inner peripheral surface of said attaching member is provided with an opposing portion disposed between the double row of rotary raceway surfaces and opposed to the outer peripheral surface of the rotor, and a pair of outer rings having the fixed raceway surfaces are fitted in the inner peripheral surface of the attaching member and on the axial opposite sides of the opposing portion.

Fitting a pair of outer rings having fixed raceway surfaces in the inner peripheral surface of the attaching member in this manner makes it possible to attach the fixed side of the wheel bearing device to the attaching member on the car body side without using fixing means such as bolts, to reduce the number of parts and the number of man-hours of assembly by an amount corresponding to the fixing means, whereby low cost and light weight can be achieved. Further, the wheel bearing device may be unitized (modularized) in a form that includes the attaching member, so that the operability in attaching the wheel bearing device to the car body is improved. Since the opposing portion opposed to the outer peripheral surface of the rotor between the rotary raceway surfaces is interposed between the two outer rings, an auxiliary part that should, as a precondition, be in opposed relation to the rotor, for example, a sensor for detecting the speed of the rotor can be disposed.

In the above arrangement, either the outer rings may be integrated with the attaching member (integral formation) or both of them may be integrated with the attaching member (integral formation). The integrating methods include among others casting and insert-molding, and further reduction of the number of parts and the number of man-hours of assembly can be achieved by these techniques.

If the opposing portion is formed as a flange projecting radially inward and the end surfaces of the outer rings are engaged with this flange, it becomes possible to axially position the outer rings and to support the axial preload on the bearing device.

The sensor can be disposed on the opposing portion as described above. In this case, since the sensor comes to be disposed in the bearing inner space having its axial opposite ends sealed by the seals, the sensor can be protected from dust, salt water, stones, etc., so that stabilized signal detection becomes possible. The seals in this case can be used also as seals for the bearing device, eliminating the need for using exclusive seals for the sensor, so that reduction of the number of parts and the number of man-hours of assembly, improvement in space efficiency, etc. are attained. The sensor can be attached so that it extends through the attaching member, and the number of man-hours of processing can be reduced since the conventional attaching holes for the outer ring become unnecessary. Further, positioning of the attaching holes between the outer rings and the attaching member is not necessary, so that the assembling operation is improved.

The sensed part is disposed on the outer peripheral surface of the rotor opposed to the sensor. If this sensed part is in the form of something that produces pulses in proportion to speed, for example, a pulse generator having a circumferentially disposed projection of magnetic material, the speed of the rotor can be accurately detected. The detected data can be utilized, for example, as rpm data for ABS's.

The rotor is, for example, one having a hub ring and an inner ring fitted in the hub ring. In this case, of the double row of rotary raceway surfaces formed in the rotor, one row may be formed in the hub ring and the other in the inner ring.

The rotor may be one having a hub ring and the outer joint member of a constant velocity joint joined to the hub ring. This is preferable as a wheel bearing device for driving wheels. In this case, of the double row of rotary raceway surfaces provided in the rotor, one row of raceway surfaces may be provided in the hub ring and the other in the outer joint member of a constant velocity joint.

The hub ring and the outer joint member may be fitted together and are crimped by being at least locally diametrically expanded or contracted, whereby they can be reliably joined together while preventing loosening.

Alternatively, the hub ring and the outer joint member may be fitted together and separably fastened. For example, they are axially tightened with a threaded end of a stein portion of the outer joint member. Thus, the hub ring and the outer joint member are detachable from the attaching member independently from each other, which allows only one that has been damaged to be repaired with great facility and economy.

BRIEF DESCRIPTION OF THE DRAWINGS

FIG. 9 is a sectional view similar to FIG. 7, showing a modification in which a sensor is received in a cylindrical member;

FIG. 10 is a sectional view showing a wire as a means for axially positioning an outer ring and a knuckle;

FIG. 11 is a fragmentary enlarged section showing annular grooves of the outer ring and knuckle in a state axially shifted;

FIG. 12 is a sectional view similar to FIG. 7, showing a modification in which pin-like members are used;

DESCRIPTION OF THE PREFERRED EMBODIMENTS

Embodiments of the invention will now be described with reference to the drawings. In addition, in the following description, with the present device installed in a vehicle, the side nearer to the outer side of the vehicle is referred to as the outboard side, and in FIGS. 1, 4 and 5, the left side is the outboard side, while the side nearer to the center of the vehicle is referred to as the inboard side, and in the same figures, the right side is the inboard side.

Figure 1:
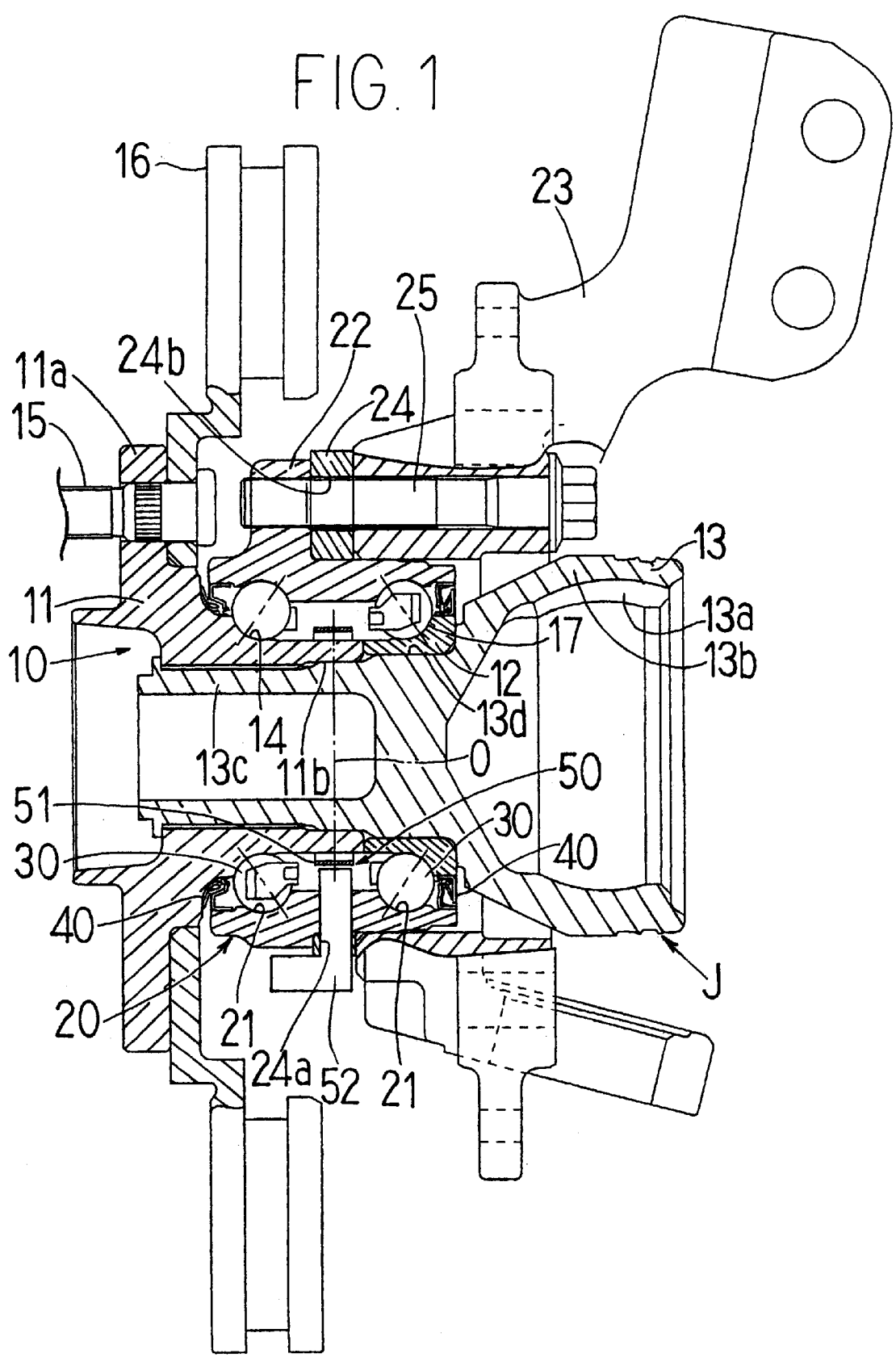
FIG. 1 is a sectional view, taken along the line I—I in FIG. 2, of a wheel bearing device according to an embodiment of the invention.

FIG. 1 shows a wheel bearing device for use in a driving wheel. This bearing device comprises as main components a rotor 10, a stator 20 disposed on the outer peripheral side of the rotor 10, a double row of rolling bodies 30 interposed between the rotor 10 and the stator 20, a pair of seals 40 for sealing the openings in the opposite ends of the bearing, and a wheel speed detecting means 50 for ABS's.

The rotor 10 is composed of a hub ring 11, an inner ring 12 fixed to the outer periphery of outer joint member 13, and an outer joint member 13 for a constant velocity joint J joined to the hub ring 11. The hub ring 11 is formed with a first raceway surface 14 substantially in the intermediate region of the outer peripheral surface, and is provided at the outboard end with a wheel attaching flange 11a for attaching a wheel. Further, the hub ring 11 is centrally provided with an axial through-hole 11b. Hub bolts 15 are set in the wheel attaching flange 11a at circumferentially equispaced intervals, by which hub bolts 15, the hub ring 11 together with a brake rotor 16 is fixed to an unillustrated wheel disk.

The constant velocity joint J comprises an inner joint member having a track groove in the outer periphery, an outer joint member 13 internally receiving the inner joint member and having a track groove 13a in the inner periphery, balls interposed between the track groove in the inner joint member and the track groove 13a in the outer joint member, and a cage for holding all the balls in the same plane (in the drawings, only the outer joint member 13 is shown). The inner joint member is adapted to be joined as by serrations to a driving shaft disposed on the engine side and connected to the constant velocity joint. The outer joint member 13 has a bowl-like mouth portion 13b and a hollow shaft-like stem portion 13c, and is fitted at the stem portion 13c in the through-hole 11b in the hub ring 11. The outer joint member 13 is joined to the hub ring 11 by serration-fitting at the stem portion 13c and radially outwardly crimping the outboard shaft end of the stem portion 13c projecting beyond the hub ring 11. The outer peripheral surface of the outer joint member 13 is formed with a small-diameter stepped portion 13d, and the inner ring 12 having a second raceway surface 17 on the outer peripheral surface is fitted on said small-diameter stepped portion 13d. The ring 12 is force-fitted on the small-diameter stepped portion 13d with a suitable amount of crimping to prevent creep. The shoulder surface of the mouth portion 13b abuts against the end surface of the inner ring 12, whereby the axial positioning of the inner ring 12 and the hub ring 11 is effected.

The outer ring 20 serving as a stator has a double row of raceway surfaces 21 on the inner peripheral surface, and a double row of rolling bodies 30 are interposed between the double row of raceway surfaces 21 and the first and second raceway surfaces 14 and 17 that are opposed thereto and disposed on the outboard and inboard sides, respectively. Balls are shown by way of example as the rolling bodies 30 but tapered rollers may be used instead of balls.

The outer peripheral surface of the outer ring 20 is integrally formed with a radially outwardly projecting flange 22, which is positioned nearer to the outboard side, more specifically, positioned more outboard than the bearing center O (the axial center between the double row of raceway surfaces 21), (the state in which the axial center of the flange 22 is located more outboard than the bearing center O), and is bolted as at 25 through a holding member 24 to be later described to a knuckle 23 extending from an attaching member on the car body side, for example, from a suspension device. The knuckle 23 has a cylindrical inner peripheral surface conforming to the cylindrical outer peripheral surface of the outer ring 20, said inner peripheral surface being fitted to the outer peripheral surface more inboard than the flange 22 of the outer ring 20.

The wheel speed detecting means 50 comprises a sensed part 51 installed on the rotary side, and a sensor 52 installed on the fixed side. The sensed part 51 is in the form of a pulse generator that generates pulses in proportion to the speed of the wheel, which is composed of a pulser ring of magnetization type formed by vulcanization-molding an elastic material containing, e.g., magnetic powder, with magnetic poles circumferentially alternately arranged. The sensed part 51 is attached on the outer peripheral surface of the rotor 10 and in the region between the first and second raceway surfaces 14 and 17 (in this embodiment, on the bearing center O between both raceway surfaces 14 and 17). On the other hand, the sensor 52 is in the form of a pulse detector for non-contactwise detecting pulse signals produced by said sensed part 51, and is composed, for example, of an electromagnetic type pickup or semiconductor (a Hall effect device, MR element or the like). The sensor 52 is held by a holding member 24 held between the end surface of the flange 22 of the outer ring 20 and the end surface of the knuckle 23, and its detecting surface extends through the outer ring 20 to be opposed to the sensed part 51. Arranging the wheel speed detecting means 50 in the bearing inner space sealed by a pair of seals 40, in this manner, results in the pulser ring 51 and sensor 52 being protected against dust, salt water, stones, etc., allowing stabilized speed detection without providing a special seal mechanism.

Figure 2:
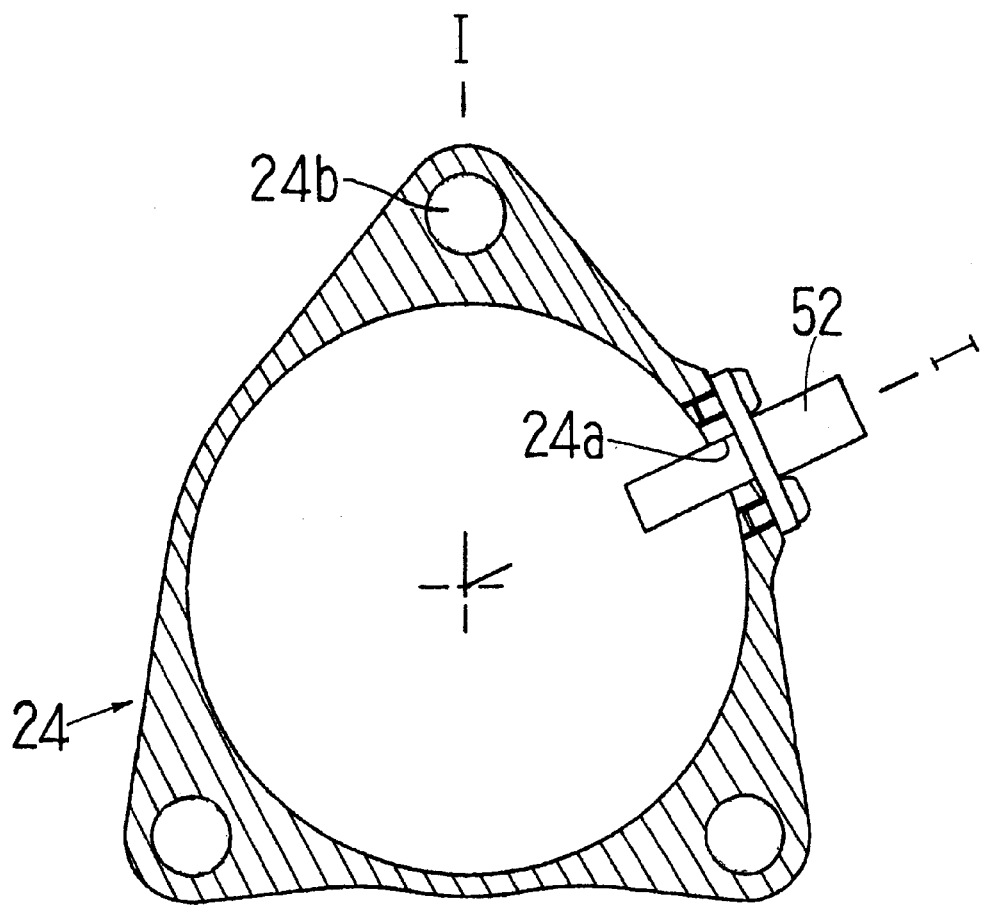
FIG. 2 is a sectional view of a holding member shown in FIG. 1.

The holding member 24 is in the form of a ring conforming to the outer peripheral shape of the flange 22 of the outer ring 20 and, as shown in FIG. 2, its inner peripheral surface is formed to be circular and its outer peripheral surface is formed to be polygonal, such as triangular or quadrangular, (in this embodiment, substantially triangular). The material of the holding member 24 is metal, such as steel. There are radially thin-walled portions, each between adjacent apexes of the holding member 24, and an attaching hole 24a for the sensor 52 is formed in such thin-walled portion to extend through the latter. The sensor 52 is inserted in the attaching hole 24a and fixed therein as by screws. Formed at each apex of the holding member 24 is a bolt hole 24b for insertion of said bolt 25 therein.

Since the holding member 24 is interposed between the flange 22 of the outer ring 20 and the knuckle 23 and holds the sensor 52, in the case where the flange 22 of the outer ring 20 is deviated to the outboard side, that is, even in the case where the inboard side of the flange 22 is widely covered by the knuckle 23 to make it difficult to dispose the sensor 52 in the bearing inner space, this disposition can be easily realized. Further, since the wheel bearing device may be unitized (modularized) in a form that includes the knuckle 23, the operability in assembling the wheel bearing device in the car body is improved.

Figure 3:
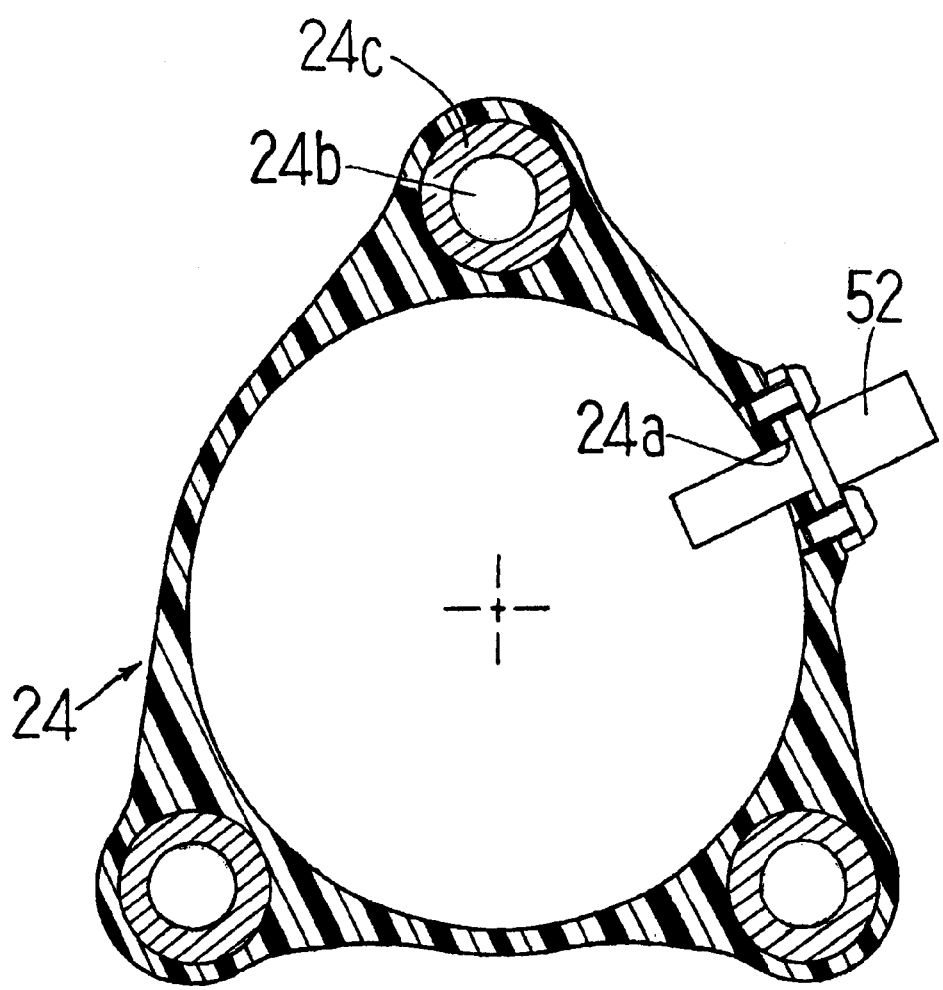
FIG. 3 is a sectional view of a modification of the holding member.

In this connection, if the knuckle 23 is made of aluminum alloy, the difference in ionization tendency between the aluminum contained therein and the steel that is the raw material for the bearing is so large that it is desirable to apply a rust preventive treatment, for example, plating with manganese phosphate or the like, to the members on the bearing side (the outer ring, holding member and the like). However, if the holding member 24 is made of resin as shown in FIG. 3, then the presence of the resin material in the interface between the aluminum and the steel makes said rust preventive treatment of the bearing member unnecessary, so that a further reduction of costs can be attained. In this case, from the standpoint of the securement of strength, etc., it is desirable to make the peripheries of the bolt holes 24b from metal as by fitting a metal ring 24C of steel or the like in each apex portion of the holding member 24.

Figure 4:
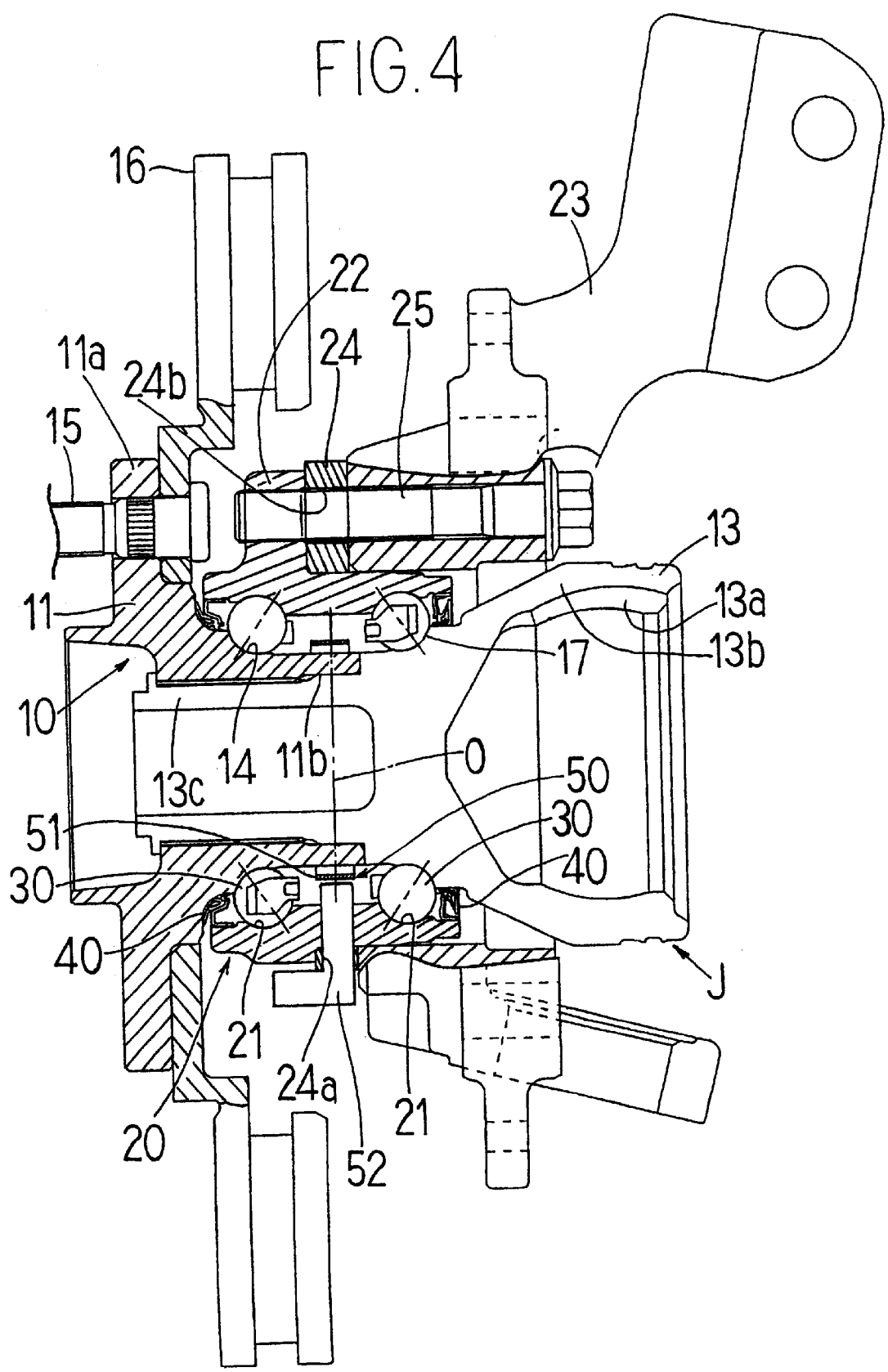
FIG. 4 is a sectional view similar to FIG. 1 showing a modification without the inner ring.

FIG. 4 shows a modification in which the inner ring 12 of the rotor 10 is dispensed with and instead the outer peripheral surface of the mouth portion 13a of the outer joint member 13 is directly provided with a second raceway surface 17. The same effect as in FIG. 1 can be obtained by interposing the holding member 24 with the sensor 52 between the flange 22 of the outer ring 20 and the knuckle 23. The rest of the arrangement is the same as in FIG. 1, so that common parts or elements are marked with common reference numerals to omit a repetitive description.

Figure 5:
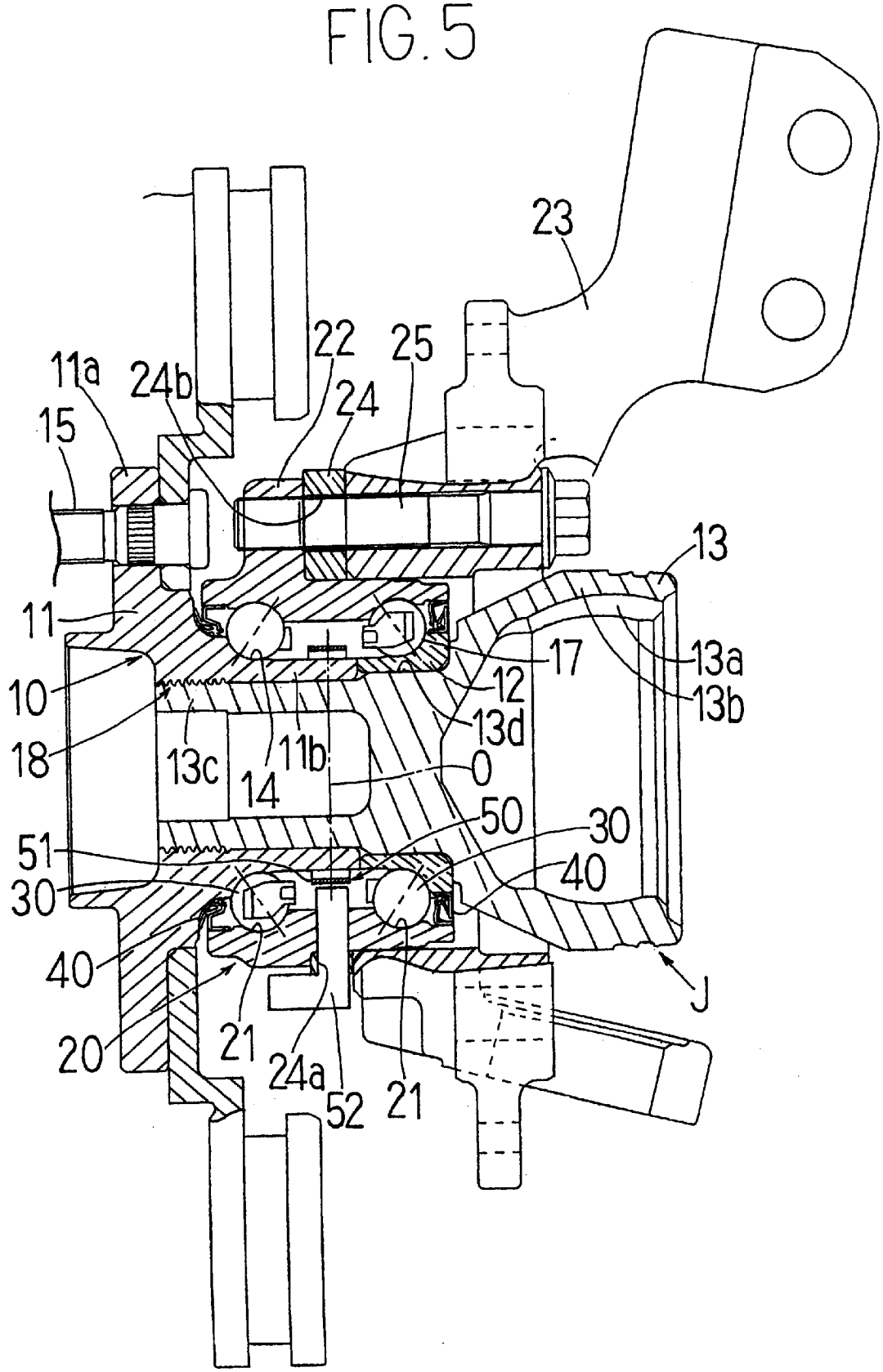
FIG. 5 is a sectional view similar to FIG. 1 showing a modification in which the hub ring and the outer joint member are joined together by crimping.
Figure 6:
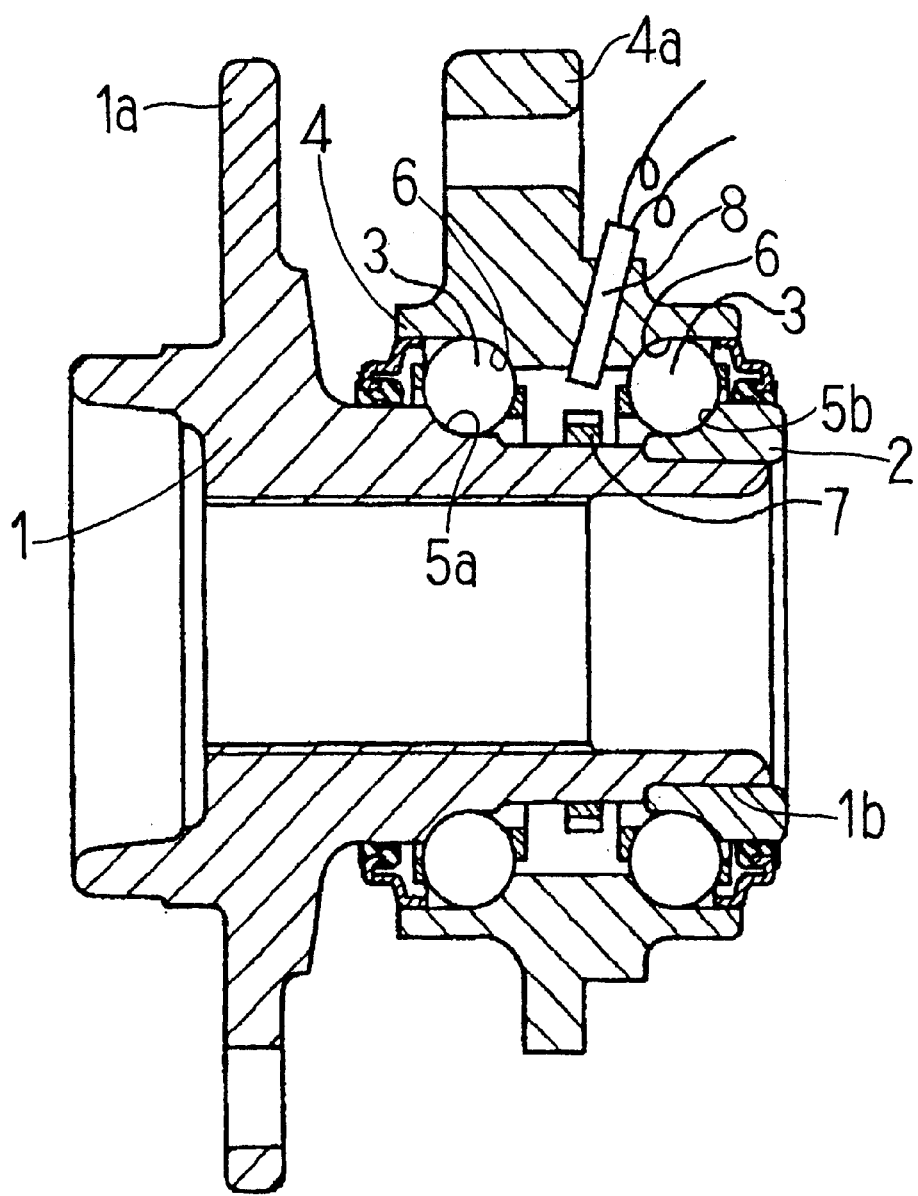
FIG. 6 is a sectional view of a conventional wheel bearing device.

FIG. 5 shows a modified example of the joining construction between the hub ring 11 and the outer joint member 13, wherein the hub ring 11 and the outer joint member 13 are fitted together and the fitting portion is crimped by at least locally expanding or contracting the diameter. For example, crimping is effected by expanding the diameter of the hollow stem portion 13c of the outer joint member 13 from the inner diameter side to the outer diameter side (the illustrated example) or by contracting the diameter of the hub ring 11 from the outer diameter side to the inner diameter side. By forming either the fitting surface of the hub ring 11 or the fitting surface of the outer joint member 13 or both with an uneven surface portion 18, the uneven surface portion 18 of one fitting surface cuts into the uneven surface portion of the other fitting surface to cause a plastic deformation that ensures firm joining, preventing loosening. The rest of the arrangement is the same as in FIG. 1, so that common parts or elements are marked with common reference numerals to omit a repetitive description.

Figure 14:
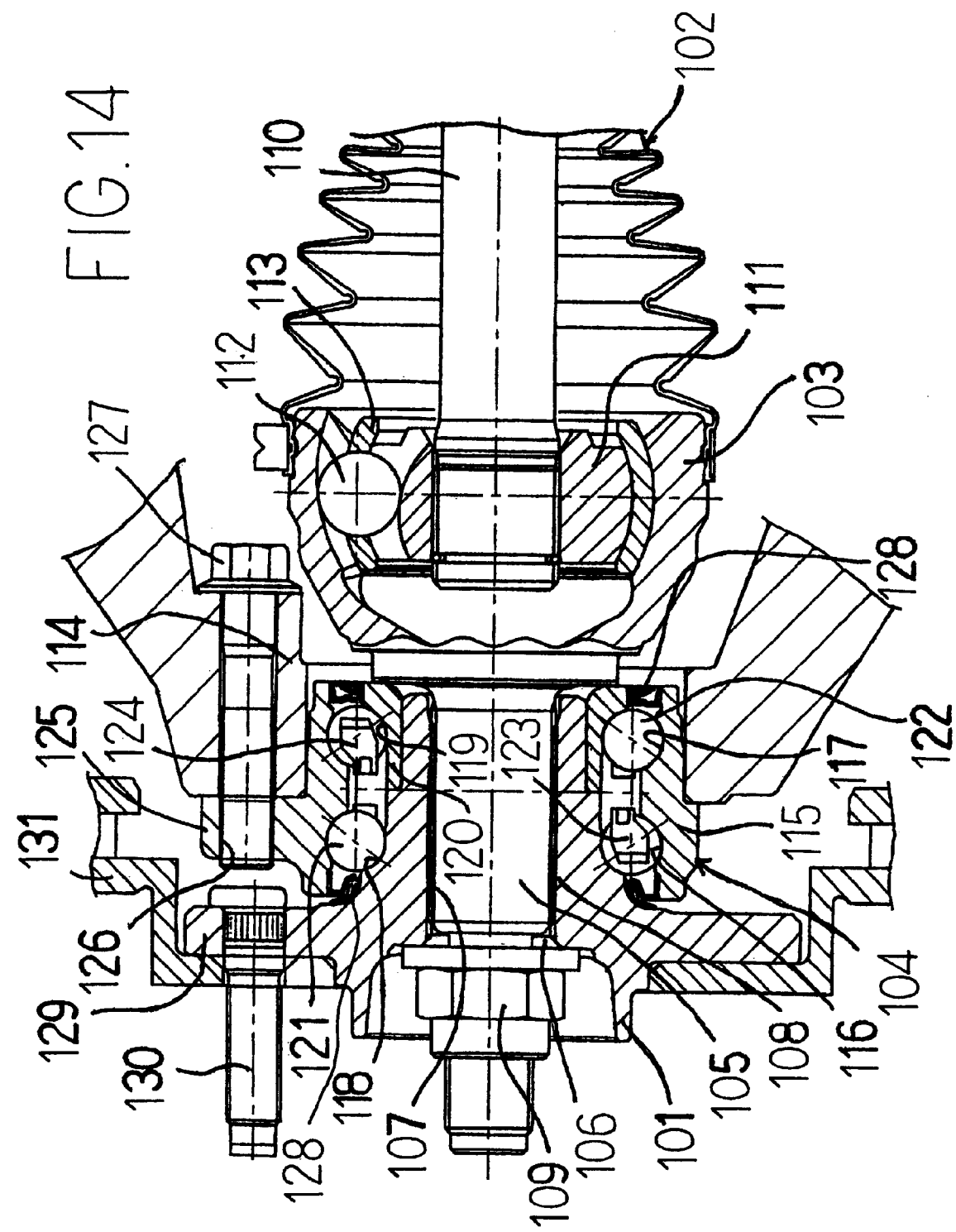
FIG. 14 is a sectional view of a conventional wheel bearing device.

FIG. 14 shows an example of a conventional wheel bearing device, illustrating an example of a construction used for driving wheels. This bearing device comprises a hub ring 101, the outer joint member 103 of a constant velocity joint 102, and an axle bearing 104 that are unitized. In addition, the outer joint member 103 of the constant velocity joint 102 has an axially extending stem portion 105 inserted in a through-hole 106 in the hub ring 101, the outer surface of the stem portion 105 and the through-hole 106 are formed with serrations 107 and 108, through which the outer joint member is joined to the hub ring 101 to allow torque transmission, the outer joint member being threadedly fixed in position by a nut 109. The constant velocity joint 102 comprises, besides the outer joint member 103, an inner joint member 111 attached to the end of a drive shaft 110, a plurality of torque-transmitting balls 112 incorporated between track grooves formed in the inner and outer joint members 111 and 103, and a cage 113 interposed between the outer spherical surface of the inner joint member 111 and the inner spherical surface of the outer joint member 103 for supporting the torque-transmitting balls 112. The wheel bearing device has a construction rotatably supporting the hub ring 101 by an axle bearing 104, the hub ring 101 having a wheel (not shown) fixed thereto, the axle bearing 104 being supported by the suspension system (not shown) of a car body through a knuckle 114.

The axle bearing 104 has the construction of a double row angular contact ball bearing, wherein the inner surface of an outer ring 115 is formed with a double row of raceway surfaces 116 and 117, one raceway surface 118 formed on the outer peripheral surface of the hub ring 101 cooperates with the other raceway surface 119 formed on the outer peripheral surface of the inner ring 120 force-fitted on the outer periphery of the end of the hub ring 101 to provide a double row of raceway surfaces 118 and 119 opposed to the raceway surfaces 116 and 117 of the outer ring 115, and a double row of rolling bodies 121 and 122 are interposed between the raceway surfaces of the outer ring 115, hub ring 101 and inner ring 120, the rolling bodies 121 and 122 in the respective rows being supported in circumferentially equispaced relationship by cages 123 and 124. The outer periphery of the outer ring 115 is formed with a car body attaching flange 125 projecting therefrom, the flange 125 being formed with female threads 126 in a plurality of locations circumferentially of the flange, with bolts 127 threadedly fitted to the female threads 126, whereby the outer ring is fixed to the knuckle 114. In addition, the axle bearing 104 is provided with a seal 128 for preventing entry of foreign matter from outside and leakage of grease charged therein. The hub ring 101 has a wheel attaching flange 129 provided with circumferentially equispaced hub bolts 130 for fixing a wheel thereto. The flange 129 of the hub ring 101 has a brake rotor 131 fixed thereto by said hub bolts 130.

In the conventional wheel bearing device, in fabricating the outer ring 115 constituting the axle bearing 104 that rotatably supports the hub ring 101, a plurality of female threads 126 for fixing the outer ring 115 to the knuckle 114 have to be cut around the circumference of the flange 125 of the outer ring 115; thus, it has been necessary to process such female threads 126. Further, since the flange 125 of the outer ring 115 has to be bolted to the knuckle 114 by utilizing the female threads 126, there has been a problem that substantial man-hours of assembly are involved in attaching the outer ring 115 to the knuckle 114. Further, from the points of view of strength including the fact that the weight of bolts 127 (each weighing, for example, about 200–300 g) for fixing the outer ring 115 to the knuckle 114 has to be supported, an additional wall-thickness is required for the flange 125, which is the region of joining to the knuckle 114, so that it has been difficult to realize light weight or size compaction of the entire device.

Another embodiment of the invention which solves the above-mentioned problems will now be described with reference to FIG. 7 in which parts like those shown in FIG. 14 are marked with like reference characters.

Figure 7:
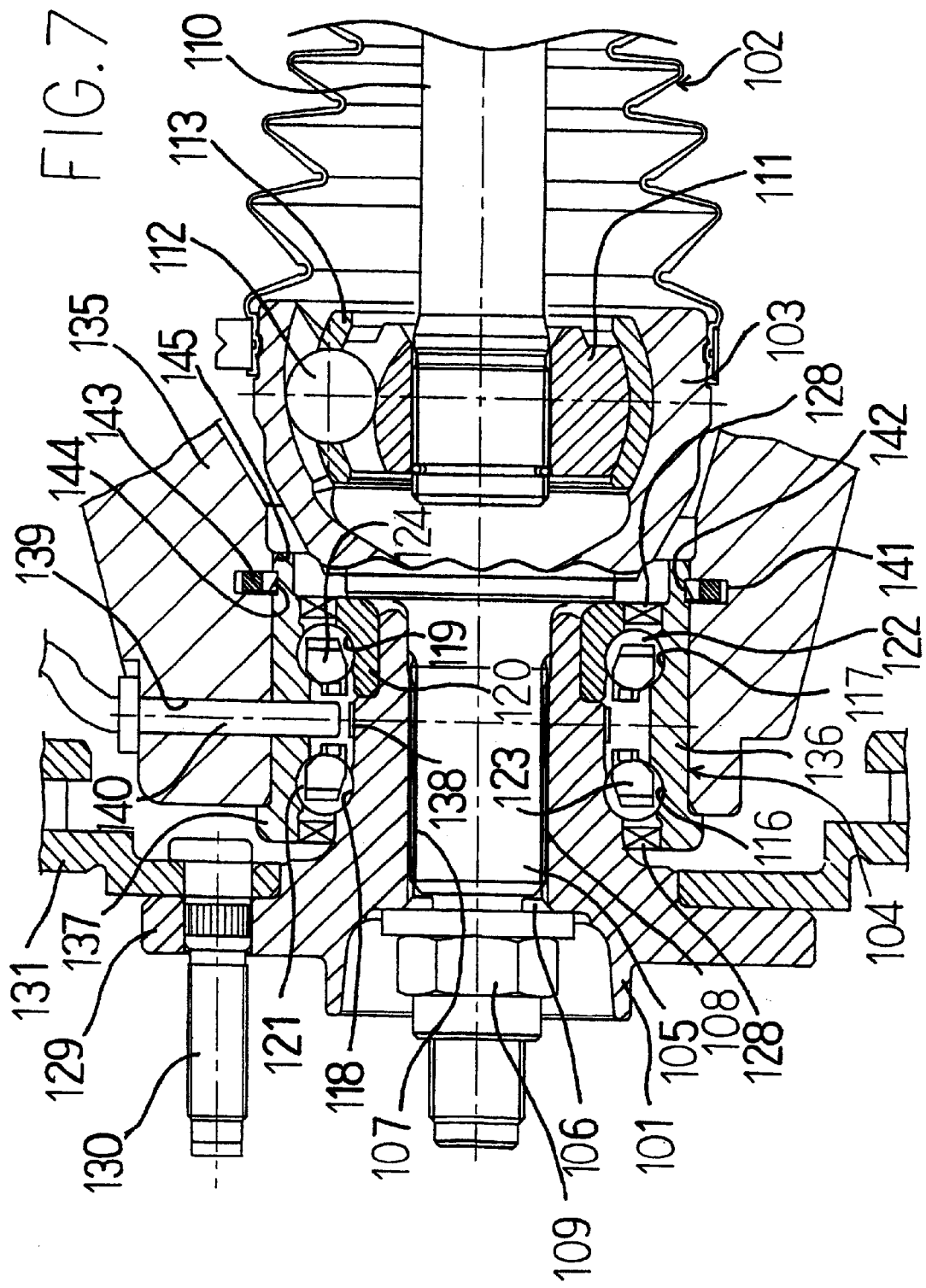
FIG. 7 is a sectional view of a wheel bearing device according to another embodiment of the invention.

A wheel bearing device shown in FIG. 7 shows an example of construction used for automobile driving wheels. This bearing device comprises a hub ring 101, the outer joint member 103 of a constant velocity joint 102, and an axle bearing 104 that are unitized. In addition, the outer joint member 103 of the constant velocity joint 102 has an axially extending stem portion 105 inserted in a through-hole 106 in the hub ring 101, the outer surface of the stem portion 105 and the through-hole 106 are formed with serrations 107 and 108, through which the outer joint member is joined to the hub ring 101 to allow torque transmission and is threadedly fixed in position by a nut 109.

In addition, this embodiment shows a construction in which the hub ring 101 and the outer joint member 103 of the constant velocity joint 102 are joined by the nut 109; however, the construction may be such that the solid stem portion 105 of the outer joint member 103 is inserted in the through-hole 106 in the hub ring 101 and plastic deformation resulting from crimping or staking the end of the stem portion 105 projecting beyond the end of the hub ring 101 is used to join the two. Further, the construction may be such that the stem portion 105 of the outer joint member 103 is hollow and the end of the stem portion 105 inserted in the through-hole 106 in the hub ring 101 is diametrically or radially outwardly expanded, the two being joined together by plastic deformation resulting from the crimping or coinning.

The constant velocity joint 102 comprises, besides the outer joint member 103, an inner joint member 111 attached to the end of a drive shaft 110, a plurality of torque-transmitting balls 112 incorporated between track grooves formed in the inner and outer joint members 111 and 103, and a cage 113 interposed between the outer spherical surface of the inner joint member 111 and the inner spherical surface of the outer joint member 103 for retaining the torque-transmitting balls 112.

This wheel bearing device has a construction rotatably supporting the hub ring 101, which is an inner member, by an axle bearing 104, the hub ring 101 having a wheel (not shown) fixed thereto, the axle bearing 104 being supported by the suspension system (not shown) of a car body through a knuckle 135, which is a fixed member. The hub ring 101 has a wheel attaching flange 129 provided with circumferentially equispaced hub bolts 130 for fixing a wheel thereto. The flange 129 of the hub ring 101 has a brake rotor 131 fixed thereto by the hub bolts 130.

The axle bearing 104 has the construction of a double row angular contact ball bearing, wherein the inner surface of an outer ring 136, which is an outer member, is formed with a double row of raceway surfaces 116 and 117, one raceway surface 118 formed on the outer peripheral surface of the hub ring 101 cooperates with the other raceway surface 119 formed on the outer peripheral surface of the inner ring 120 force-fitted on the outer periphery of the smaller-diameter end of the hub ring 101 to provide a double row of raceway surfaces 118 and 119 opposed to the raceway surfaces 116 and 117 of the outer ring 136, and a double row of rolling bodies 121 and 122 are interposed between the raceway surfaces of the outer ring 136, hub ring 101 and inner ring 120, the rolling bodies 121 and 122 in the respective rows being supported in circumferentially equispaced relationship by cages 123 and 124. In addition, the axle bearing 104 is provided with a seal 128 for preventing entry of foreign matter from outside and leakage of grease charged therein.

The end of the outer ring 136 on the outboard side is formed with a larger-diameter stepped portion 137 to serve for positioning relative to a knuckle 135, so that when the axle bearing 104 is force-fitted from the outboard side of the knuckle 135, positioning is effected in that the larger-diameter stepped portion 137 of the outer ring 136 engages the end of the knuckle 135.

It is common practice to incorporate a wheel speed detecting means for ABS's (antilock brake systems) into this wheel bearing device. Accordingly, a pulser ring 138 (sensed part) serving as a pulse generator is installed between one raceway surface 118 formed on the outer surface of the hub ring 101 and the other raceway surface 119 formed on the outer surface of the inner ring 120. In addition, instead of the pulser ring 138, it is also possible to use an encoder magnetized with S and N poles.

In this embodiment, the outer ring 136 and knuckle 135 have a hole 139 radially formed therethrough, and cylindrical speed detecting sensor 140 serving as a pulse detector is inserted in the hole 139 until it is opposed to the pulser ring 138. This eliminates the need for forming a car body attaching flange on the outer ring 136 and bolting it to the knuckle (see FIG. 14), making it possible to reduce weight and costs by an amount corresponding to at least the bolts; further, since there is no need to form such flange, light weight and cost reduction are attained more easily, allowing unitization (modularization), which makes it possible to cut down on the operation of attachment to the car body. Further, even if there is no allowance for the crimping of the outer ring 136 fitted in the knuckle 135, the sensor 140 prevents the outer ring 136 from creeping.

Figures 8A, 8B:
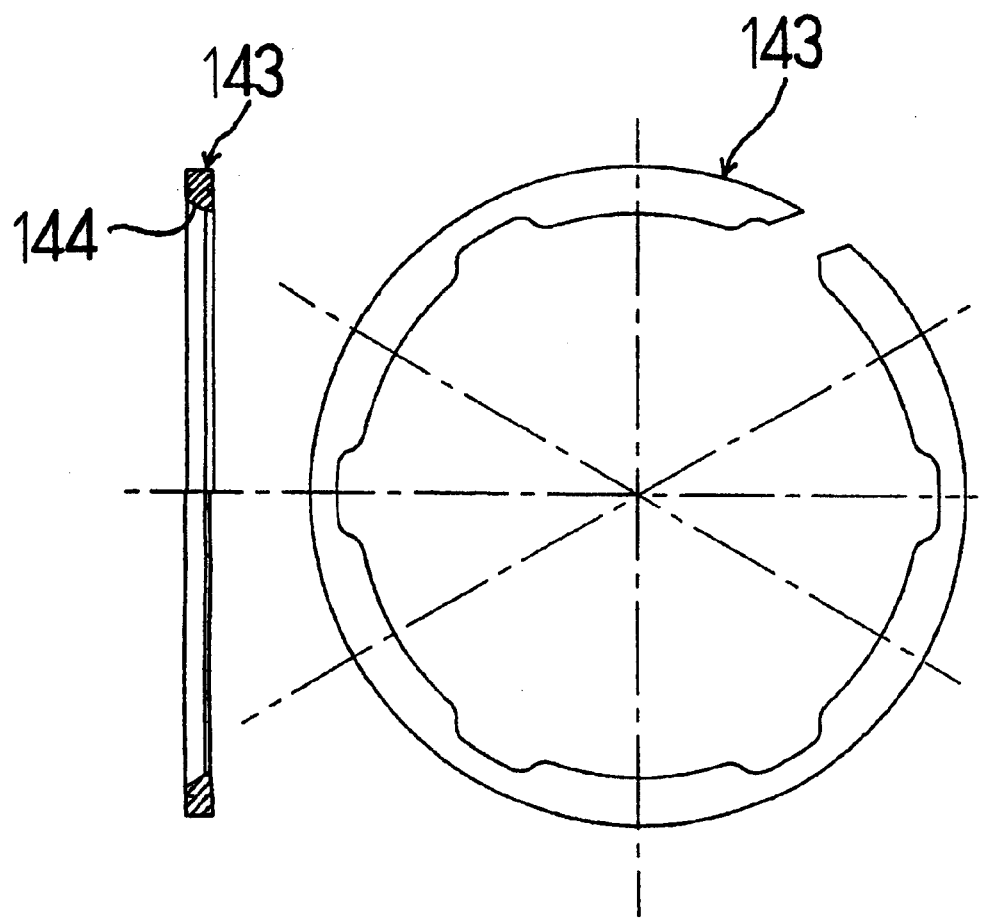
FIG. 8A shows a snap ring used in the embodiment shown in FIG. 7.
FIG. 8B is a sectional view of the snap ring.

A snap ring 143, which is a locking member, is fitted in and bites into annular grooves 141 and 142 formed in the fitting surfaces of the knuckle 135 and outer ring 136. This biting of the snap ring 143 into the annular grooves 141 and 142 of the knuckle 135 and outer ring 136 makes it possible to axially position and fix the outer ring 136 relative to the knuckle 135. The snap ring 143, as shown in FIGS. 8A and 8B, is of a diametrically contractible end-having type having an elastic restoring force, and attachment thereof between the knuckle 135 and outer ring 136 is effected in the following manner. First, the snap ring 143 received in the annular groove 141 in the inner surface of the knuckle 135 is diametrically expanded by force-fitting the outer ring 136 into the knuckle 135, and when the axial positions of their annular grooves 141 and 142 agree with each other, the snap ring 143 is diametrically contracted by its elastic restoring force to engage the annular groove 142 of the outer ring 136, thereby axially positioning and fixing the knuckle 135 and outer ring 136.

In addition, the snap ring 143 described above has a taper surface 144 formed on the inner surface thereof on the outboard side, so that when the outer ring 136 is force-fitted from the outboard side of the knuckle 135, a chamfered portion 145 formed on the outer surface of the inboard end of the outer ring 136 abuts against the taper surface 144 to diametrically expand the snap ring 143. Further, if the snap ring 143 has an uneven shape, such as a circumferentially continuously formed wavy shape, it is possible to prevent the outer ring 136 from axial playing.

A modified wheel bearing device shown in FIG. 9 has, besides the attaching construction for the sensor 140 of FIG. 7, a construction in which in order to increase the strength of the sensor itself, the sensor 140 is fitted in a hole 139 in the knuckle 135 and outer ring 136 through a cylindrical member 146, such as a roll spring pin. In this construction, creeping of the outer ring 136 can be prevented by the sensor 140 and the axial positioning and fixing of the outer ring 136 is also possible; however, if the a snap ring 143 is mounted on the fitting interface between the knuckle 135 and outer ring 136 as in the case of the embodiment shown in FIG. 7, the axial positioning and fixing of the outer ring 136 becomes more reliable.

Further, in the embodiments shown in FIGS. 7 and 9 described above have used the snap ring 143 as a locking member as shown in FIGS. 8A and 8B; however, a wire may be used as a locking member other than the snap ring. That is, as shown in FIG. 10, annular grooves 141 and 142 are respectively formed in the inner surface of the knuckle 135 and the outer surface of the outer ring 136 and a tangential hole 148 is formed that communicates with the annular groove 141 of the knuckle 135 and that tangentially extends from a place in the annular groove 141 to open to the outer periphery of the knuckle 135. In addition, such tangential holes 148 may be formed at a plurality of peripheral places in the knuckle 135.

In this case, the wire 149 is inserted from the opening in the tangential hole 148 in the knuckle 135 with the outer ring 136 force-fitted into the knuckle 135 and their annular grooves 141 and 142 axially positioned. This wire 149 is introduced into their annular grooves 141 and 142 through the tangential hole 148 to engage the annular grooves 141 and 142 in the knuckle 135 and outer ring 136, whereby the outer ring 136 is prevented from turning relative to the knuckle 135 and the axial portioning and fixing of the outer ring 136 relative to the knuckle 135 becomes possible.

Further, as shown in FIG. 11, if a construction in which the axial phase of the annular grooves 141 and 142 formed in the fitting surfaces of the knuckle 135 and outer ring 136 is slightly shifted, that is, a construction in which the annular grooves 141 in the inner surface of the knuckle 135 and the annular groove 142 in the outer surface of the outer ring 136 are formed in axially shifted positions, is employed, then the elastic deformation and plastic deformation of the wire 149 and the two members, the knuckle 135 and outer ring 136, may be utilized to position and fix the knuckle 135 and outer ring 136 with axial preload acting thereon. Therefore, positioning and fixing of the knuckle 135 and outer ring 136 becomes firmer in the axial direction.

In addition, even if the construction in which the axial phase of the annular grooves 141 and 142 formed in the fitting surfaces of the knuckle 135 and outer ring 136 is slightly shifted, as described above, is not employed, it follows that if the width (axial dimension) of the annular grooves 141 and 142 is set at a value slightly smaller than the diameter of the wire 149, then the wire 149 and either the knuckle 135 or the outer ring 136 or both will elastically and plastically deform depending upon the materials of the wire 149, knuckle 135 and outer ring 136 when the knuckle 135 and outer ring 136 are axially positioned and fixed; thus, an axially preloaded state is obtained.

Further, if the wire 149 is used as the locking member, the diameter of the tangential hole 148 may, since no preloading is required in this portion, be set at a value somewhat larger than the diameter of the wire 149 to facilitate insertion of the wire 149. Further, it is desirable to round the front end of the wire 149 in order to reduce the resistance to wire insertion as much as possible and to facilitate the insertion of the wire 149.

Further, besides the use of the wire 149 as a locking member, it is also possible to use bearing steel balls. That is, bearing steel balls are successively inserted from the opening in the tangential hole 148 in the knuckle 135 so that they may engage the annular grooves 141 and 142 of the knuckle 135 and outer ring 136. Engaging the bearing steel balls with the annular grooves 141 and 142 of the knuckle 135 and with the tangential hole 148 in this manner means that a construction has been made that allows positioning and fixing of the knuckle 135 and outer ring 136.

Another modification is shown in FIG. 12, in which an annular groove 151 is formed substantially in the middle of the outer surface of the outer ring 136, a single hole 152 is formed radially therethrough, and three holes 153 are formed in the knuckle 135 to extend radially therethrough. A sensor 140 is fitted in the single hole 152 and one of the three holes 153 in the knuckle that communicates with the hole 152 in said outer ring 136 so that it is opposed to a pulser ring 138. Further, a pin-like member 154 is fitted in each of the remaining two holes 153 in the knuckle 135 to engage the annular groove 151 of the outer ring 136, thereby axially positioning and fixing the outer ring 136 (See FIGS. 13A and 13B).

Figure 13A:
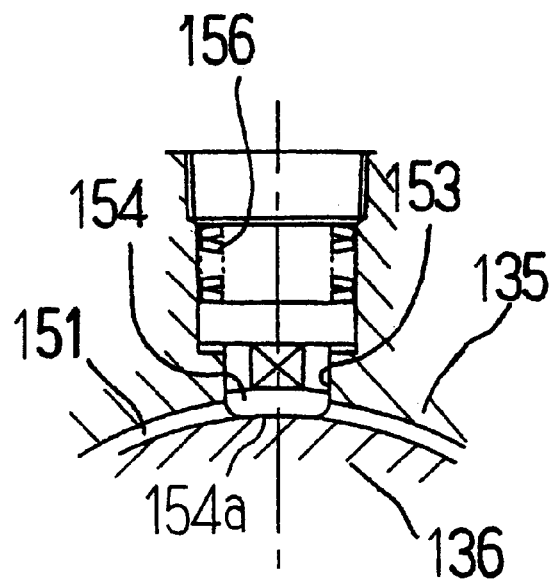
FIG. 13A is a section showing a pin-like member having a concave surface conforming to the curvature of the annular groove of the outer ring is mounted.
Figure 13B:
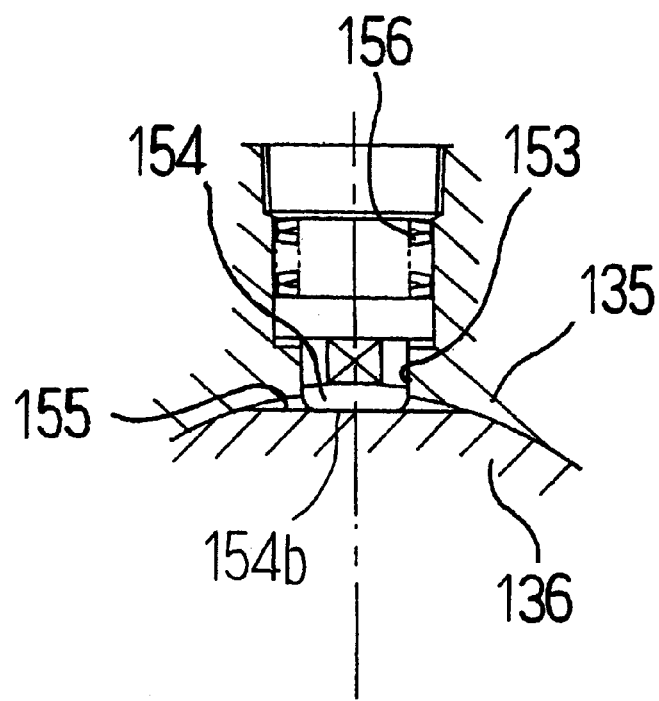
FIG. 13B is a section showing a state in which a pin-like member having a flat surface conforming to the flat surface of the outer ring is mounted.

Creeping of the outer ring 136 can be prevented by the sensor 140 fitted in the holes 153 and 152 in the knuckle 135 and outer ring 136 or as shown in FIG. 13A by concaving the front end 154a of the aforesaid pin-like member 154 fitted in the hole 153 in the knuckle 135 and engaged in the annular groove 151 of the outer ring 136, such that the concavity conforms to the curvature of the annular groove 151 of the outer ring 136. Further, creeping of the outer ring 136 can also be prevented, as shown in FIG. 13B by forming a flat surface 155, instead of the annular groove 151 of the outer ring 136, on part of the outer surface of the outer ring 136, flattening the front end of the pin-like member 154 and abutting them against each other.

If the construction is such that the pin-like member 154 is fitted in the hole 153 in the knuckle 135 through a disk spring 156 so that it is allowed to project or retract radially, the pin-like member 154 can be engaged in the annular groove 151 of the outer ring 136 by a predetermined urging force provided by the elastic force of the disk spring 156 facing the outer ring. In this case, in force-fitting the knuckle 135 into the outer ring 136, the pin-like member 154 may be fitted in the knuckle 135 in advance by the elastic deformation of the disk spring 156. This improves the assembling operation and, if the sensor 140 is removed, allows the outer ring 136 to be withdrawn with a predetermined axial load applied thereto.

The above-described embodiments refer to a third generation construction in which, in the axle bearing 104, of the double row of raceway surfaces 118 and 119 opposed to the double row of raceway surfaces 116 and 117 formed on the inner surface of the outer ring 136, one raceway surface 119 (on the inboard side) is formed by a member (inner ring 120) separate from the hub ring 101; however, a second generation construction in which the other raceway surface 118 (on the outboard side) is also formed by a member separate from the hub ring 101. Or a fourth generation construction in which the raceway surface 118 on the outboard side is formed on the outer peripheral surface of the hub ring 101 while the raceway surface 119 on the inboard side is formed on the outer peripheral surface of the constant velocity joint 102 can be applicable, too.

Figure 19:
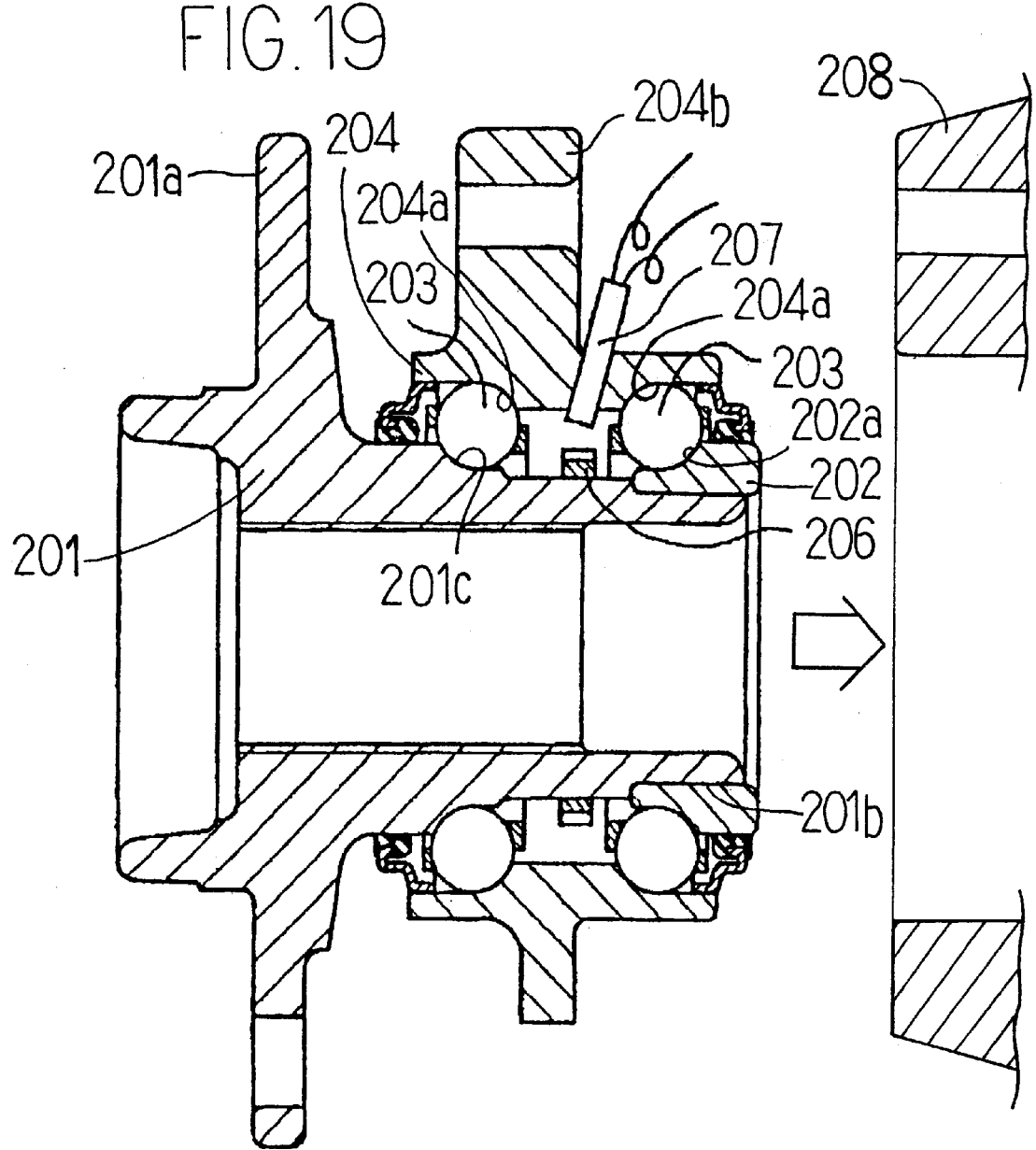
FIG. 19 is a sectional view of a conventional wheel bearings device.

A conventional wheel bearing device in FIG. 19 comprises a hub ring 201, an inner ring 202, a double row of rolling bodies 203, and an outer ring 204. The outer peripheral surface of the hub ring 201 is formed with a wheel attaching flange 201a for fixing a wheel on the outboard end thereof and with a first raceway surface 201c in the intermediate portion thereof. The inboard end of the hub ring 201 is firmed with a small diameter stepped portion 201b whose outer diameter is reduced, the small diameter stepped portion 201b having fitted thereon the inner ring 202, whose outer peripheral surface is formed with a second raceway surface 202a. The inner peripheral surface of the outer ring 204 is formed with a double row of raceway surfaces 204a oppose to the first and second raceway surfaces 201c and 202a, and a double row of rolling bodies 203 are incorporated between the first and second raceway surfaces 201c and 202a and the double row of raceway surfaces 204a. The outer ring 204 is fixed to a knuckle 208 extending from an unillustrated suspension system through a flange 204b formed on the outer peripheral surface. As for an arrangement in which a wheel speed detecting means for ABS's (antilock brake systems) is incorporated in this wheel bearing device, one is known in which, as shown in the same figure, a pulser ring 206 serving as a pulse generator is installed between the first raceway surface 201c of the outer peripheral surface of the hub ring 201 and the second raceway surface 202a and a sensor 207 serving as a pulse detector extends through the outer ring 204 to be opposed to the pulser ring 206.

When the assembly of the wheel bearing device is to be attached to a car body, usually, the inboard side of the flange 204b on the outer peripheral surface of the outer ring 204 is inserted in the inner peripheral surface of the knuckle 208 and fixed to the knuckle 208 by unillustrated bolts. With this construction, however, a plurality of long bolts have to be tightened, thus lowering the efficiency of the attaching operation, and it is necessary to tap the flange 204b for formation of bolt holes and to drill the knuckle 208, thus increasing the number of man-hours of processing. Further, the ABS sensor 207 has to be removed during insertion of the outer ring 204 into the knuckle 208 in order to avoid interference with the knuckle 208, and after the completion of insertion, it has to be inserted in the attaching holes in the knuckle 208 and outer ring 204; during insertion the these attaching holes have to be circumferentially accurately aligned with each other, so that the assembling operation is troublesome. Since a sensor attaching hole is to be formed both in the knuckle 208 and in the outer ring 204, the number of man-hours of processing is large.

Figure 20:
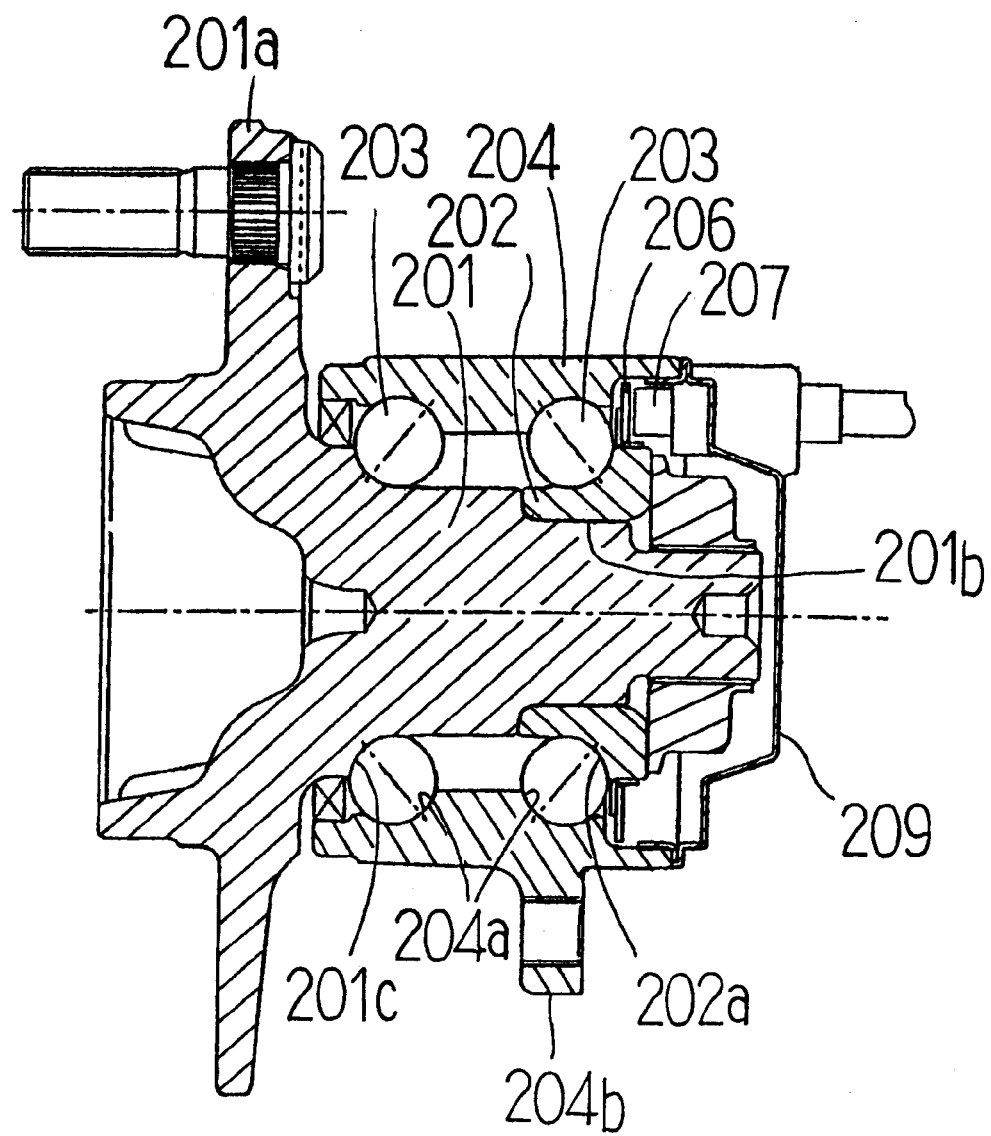
FIG. 20 is a sectional view of another conventional wheel bearing device.

Besides this, another arrangement for the wheel bearing device having wheel speed detecting means is known, in which, as shown in FIG. 20, the sensor 207 is disposed outside the bearing (on inboard side), while the pulser ring 206 is attached to the rotary side, e.g., the inner ring 202 through an axial gap (or radial gap). In this construction, however, in order to protect the pulser ring 206 and sensor 207 from dust, salt water, stones, etc. and to prevent magnetic shorting due to iron powder flying in, it is necessary to cover them by a steel cover 209, a fact which is not desirable from the standpoint of the number of parts, man-hours of assembly, space efficiency, etc.

Embodiments of the invention which solves the problems as previously described in relation to FIGS. 19 and 20 will now be described with reference to FIGS. 15 through 18 and 21.

Figure 15:
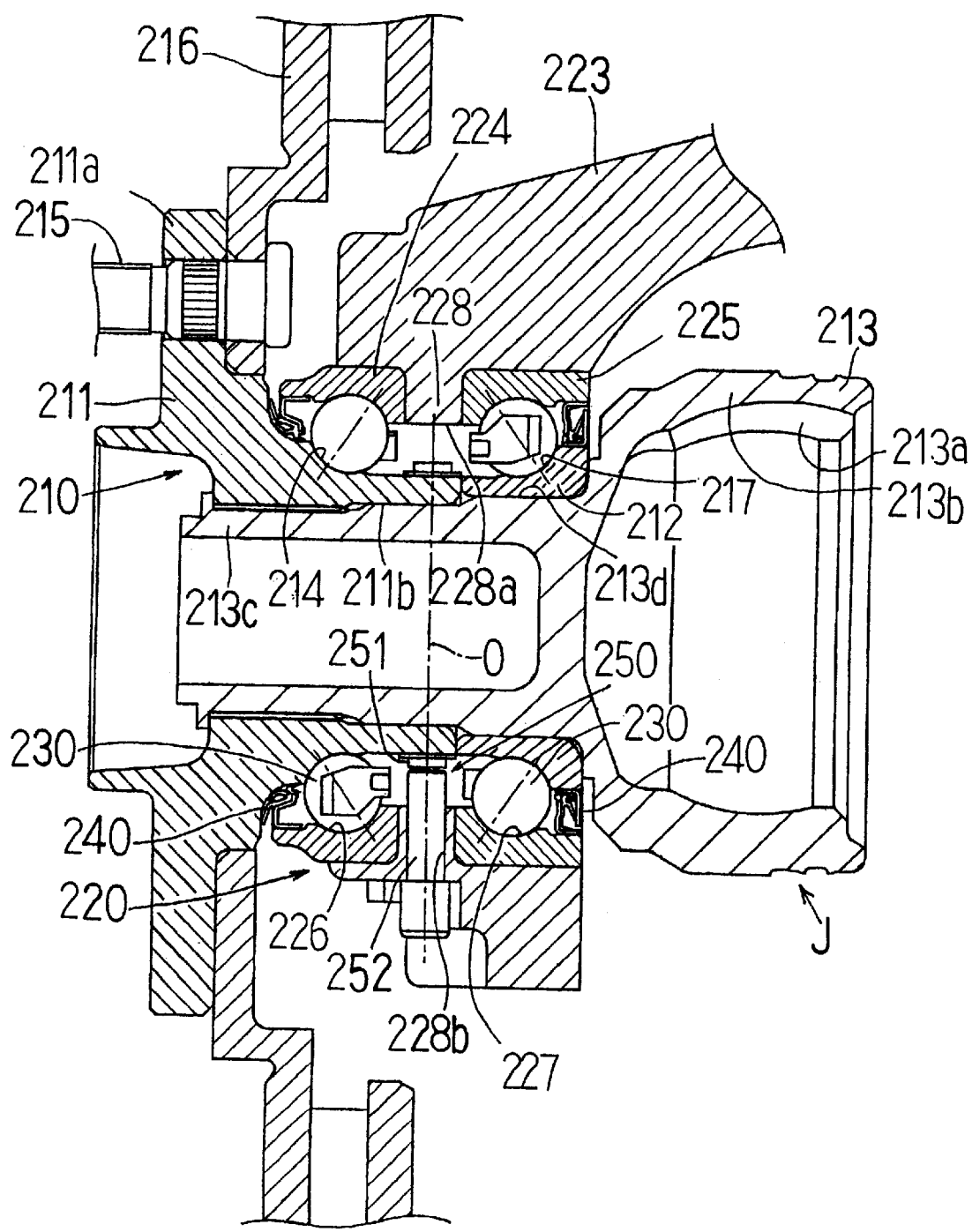
FIG. 15 is a sectional view of a wheel bearing device according to other embodiment of the invention.

FIG. 15 shows a wheel bearing device, particularly showing, by way of example, one for driving wheels. This bearing device comprises as its main components a rotor 210 having a double row of raceway surfaces 214 and 217 on its outer peripheral surface, a stator 220 disposed on the outer periphery of the rotor 210 and having a double row of fixed raceway surfaces 226 and 227 on the inner peripheral surface, a double row of rolling bodies 230 interposed between the rotor 210 and the stator 220, a pair of seals 240 for sealing the opposite openings in the bearing, and a wheel speed detecting means 250 for ABS's.

The rotor 210 is composed of a hub ring 211, an inner ring 212 fixed to the outer periphery of the outer joint member 213, and an outer joint member 213 for a constant velocity joint J joined to the hub ring 211. The hub ring 211 is formed with an inboard raceway surface 214 substantially in the intermediate region of the outer peripheral surface, and is provided at the outboard end with a wheel attaching flange 211a for attaching a wheel. Further, the hub ring 211 is centrally provided with an axial through-hole 211b. Hub bolts 215 are set in the wheel attaching flange 211a at circumferentially equispaced positions, by which hub bolts 215, the hub ring 211 together with a brake rotor 216 is fixed to an unillustrated wheel disk.

The constant velocity joint J comprises an inner joint member having a track groove in the outer periphery, an outer joint member 213 internally receiving the inner joint member and having a track groove 213a in the inner periphery, balls interposed between the track groove in the inner joint member and the track groove 213a in the outer joint member, and a cage for retaining all the balls in the same plane (in the drawings, only the outer joint member 213 is shown).

The inner joint member is adapted to be joined as by serrations to a driving shaft disposed on the engine side and connected to the constant velocity joint. The outer joint member 213 has a bowl-like mouth portion 213b and a hollow shaft-like stem portion 213c, and is fitted at the stem portion 213c in the through-hole 211b in the hub ring 211. The outer peripheral surface of the outer joint member 213 is formed with a small-diameter stepped portion 213d, and the inner ring 212 having an outboard raceway surface 217 on the outer peripheral surface is fitted on said small-diameter stepped portion 213d. The inner ring 212 is force-fitted on the small-diameter stepped portion 213d with a suitable amount of crimping to prevent creep. The shoulder surface of the mouth portion 213b abuts against the end surface of the inner ring 212, whereby the axial positioning of the inner ring 212 and the hub ring 211 is effected. The outer joint member 213 is joined to the hub ring 211 by serration-fitting at the stem portion 213c and radially outwardly crimping the outboard shaft end of the stem portion 213c projecting beyond the hub ring 211. This crimping applies preloading to the rolling bodies 230. Since the rolling bodies 230 have contact angles, the preloading increases the bearing rigidity and enables the bearing to support moment loads. In addition, balls are shown by way of example as the rolling bodies 230 but tapered rollers may be used instead of balls.

The stator 220 is composed of an attaching member associated with the car body, e.g., a knuckle 223 extending from a suspension system, and a pair of outer rings 224 and 225 fitted in the inner peripheral surface of the knuckle 223. The outer rings 224 and 225 have non-rotary, fixed raceway surfaces 226 and 227 on the irrespective inner peripheral surfaces. A double row of rolling bodies 230 are installed between the double row of fixed raceway surfaces 226 and 227 and the rotary raceway surfaces 214 and 217 opposed thereto. A pair of seals 240 are fixedly fitted between the inner peripheral surface of the outboard outer ring 224 and the outer peripheral surface of the hub ring 211 and between the inner peripheral surface of the inboard outer ring 225 and the outer peripheral surfaces of the inner ring 212.

The cylindrical inner peripheral surface of the knuckle 223 positioned at the bearing center O (the axial center between the double row of fixed raceway surfaces 226 and 227) is formed with a flange 228 projecting radially inward. The outer rings 224 and 225 are fixedly force-fitted in the knuckle 223 on the opposite axial sides of the flange 228. The end surfaces of the outer rings 224 and 225 opposed to the flange 228 are respectively in engagement with the end surface of the flange 228, whereby the outer rings 224 and 225 are axially positioned and preloaded. The inner peripheral surface 228a of the flange 228 constitutes an opposing portion noncontact-wise opposed to the outer peripheral surface of the rotor 210 (in this embodiment, the hub 211), the inner diameter of the opposing portion 228a being substantially equal to that of the shoulders of the outer rings 224 and 225 adjacent the flange 228.

The wheel speed detecting means 250 comprises a sensed part 251 installed on the rotary side, and a sensor 252 installed on the fixed side. The sensed part 251 is in the form of a pulse generator that generates pulses in proportion to the speed of the wheel, which is composed of a pulser ring of magnetization type formed by vulcanization-molding an elastic material containing, e.g., magnetic powder, with magnetic poles circumferentially alternately arranged. In the present invention, the sensed part 251 is attached to a region (in this embodiment, the bearing center O) on the outer peripheral surface of the rotor 210 and between the double row of rotary raceway surfaces 214 and 217. On the other hand, the sensor 252 is in the form of a pulse detector for non-contactwise detecting pulse signals produced by said sensed part 251, and is composed, for example, of an electromagnetic type pickup or semiconductor element (a Hall effect device, MR element or the like). The sensor 252 is inserted in an attaching hole 228b formed to extend through the flange 228 of the knuckle 223 and is fixed to the knuckle 223 as by thread. The detecting surface of the sensor 252 projects from the opposing portion 228a and is opposed to the sensed part 251 with a very small clearance defined therebetween.

Thus, the two outer rings 224 and 225 respectively having the fixed raceway surface 226 and 227 are fitted in the inner peripheral surface of the knuckle 223 and their fixing is effected by force-fitting the outer rings 224 and 225 in the inner peripheral surface of the knuckle 223 rather than bolting the flange 204b (see FIGS. 19 and 20) to the knuckle 223 as in the prior art. Therefore, it is possible to reduce the number of parts by an amount corresponding to the bolts and to omit the bolt tightening operation and bolt hole preparing operation, whereby low cost, light weight, improved productivity, etc. can be achieved. Further, since the wheel bearing device may be unitized (modularized) in a form that includes the knuckle, the operability in attaching the wheel bearing device to the car body is improved. Further, attaching the sensor 252 to the flange 228 makes it possible to dispose the wheel speed detecting means 250 in the bearing inner space having its axial opposite ends sealed by the seals 240. This protects the pulser ring 251 and sensor 252 from dust, salt water, stones, etc., making it possible to achieve stabilized speed detection without providing an exclusive seal mechanism. In this case, since it is not necessary to provide a hole in the outer ring for attaching the sensor, the number of man-hours of processing can be reduced as compared with the prior art. Further, since the alignment of attaching holes between the outer ring and the knuckle 223 becomes unnecessary, the operability in assembly is also improved.

Figure 16:
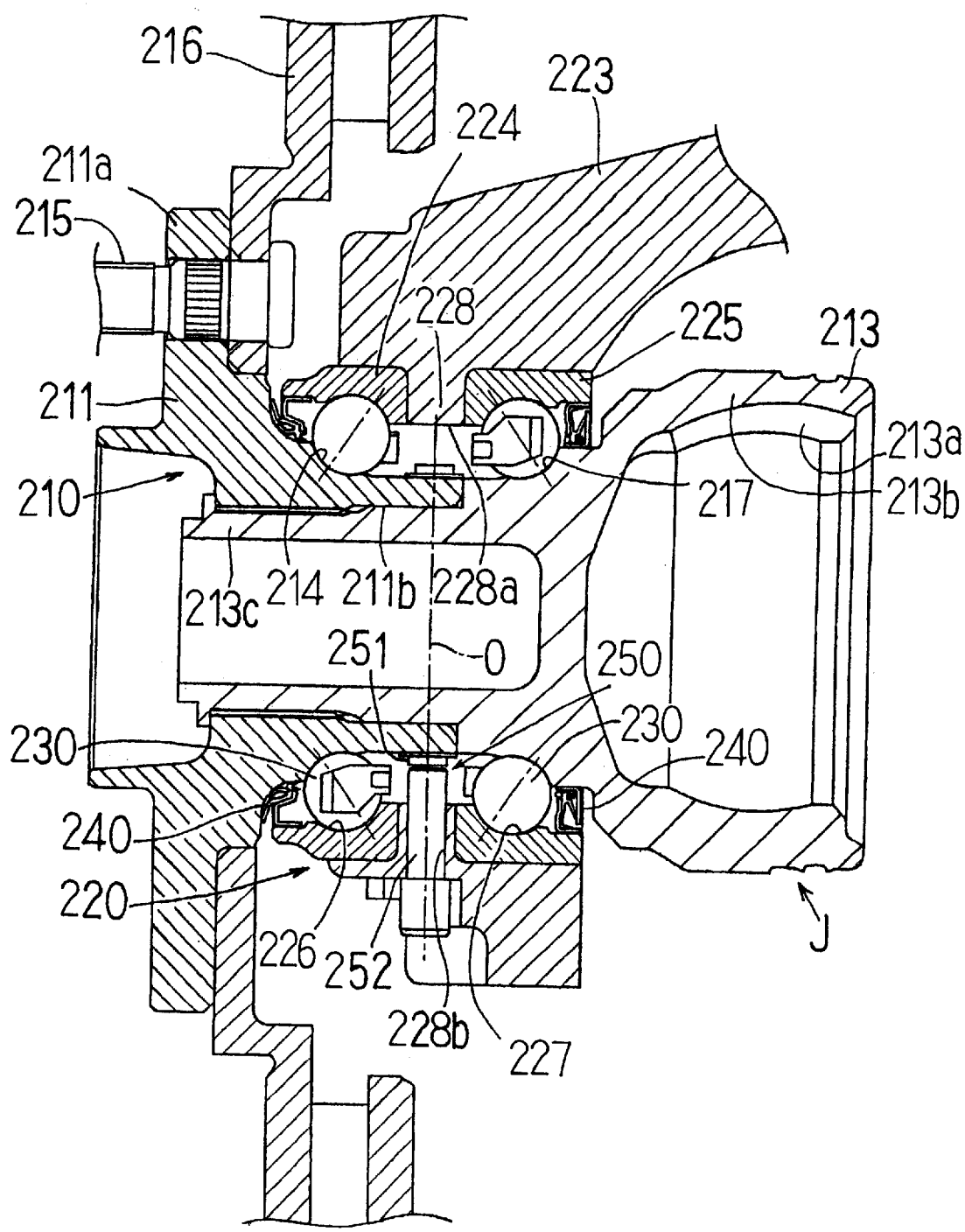
FIG. 16 is a sectional view similar to FIG. 15, showing a modification without an inner ring.

FIG. 16 shows a modification in which the inner ring 212 of the rotor 210 is dispensed with and a second raceway surface 217 is directly provided on the outer periphery of the mouth portion 213a of the outer joint member 213, with the same effects as those in FIG. 15 attained. The rest of the arrangement is the same as in FIG. 15, so that common parts and elements are marked with common reference numerals to omit a repetitive description thereof.

Figure 17:
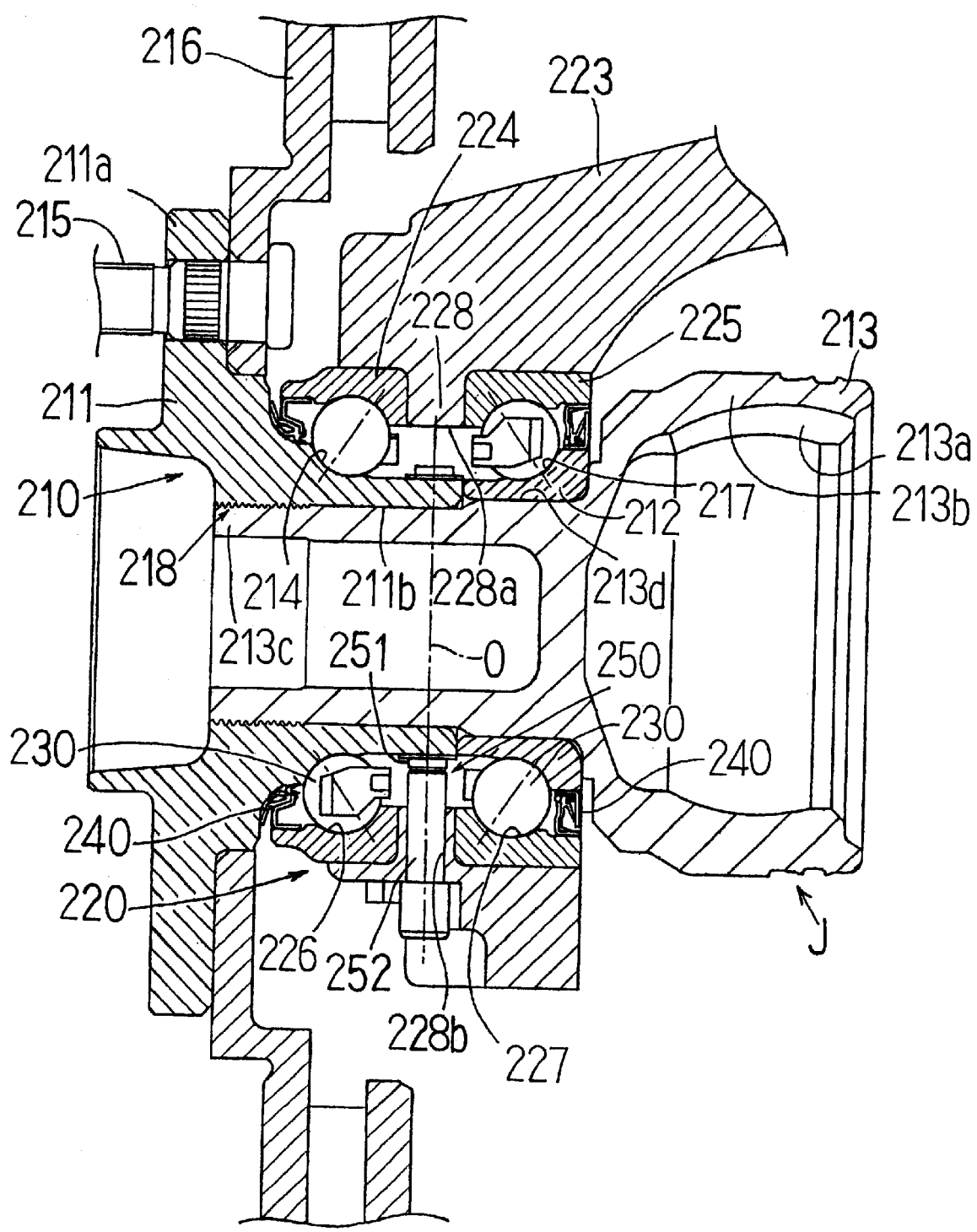
FIG. 17 is a sectional view similar to FIG. 15, showing a modification in which a hub ring and an outer joint member are joined together by crimping.

FIG. 17 shows a modified example of the joining construction between the hub ring 211 and the outer joint member 213, wherein the hub ring 211 and the outer joint member 213 are fitted together and the fitting portion is crimped by being at least locally diametrically expanded or contracted. For example, crimping or coinning is effected by expanding the diameter of the hollow stem portion 213c of the outer joint member 213 from the inner diameter side to the outer diameter side (the illustrated example) or by contracting the diameter of the hub ring 211 from the outer diameter side to the inner diameter side. By forming either the fitting surface of the hub ring 211 or the fitting surface of the outer joint member 213 or both with an uneven surface portion 218, the uneven surface portion 218 of one fitting surface cuts into the uneven surface portion of the other fitting surface to cause a plastic deformation that ensures firm joining, preventing loosening. The rest of the arrangement is the same as in FIG. 15, so that common parts and elements are marked with common reference numerals to omit a repetitive description thereof.

Figure 18:
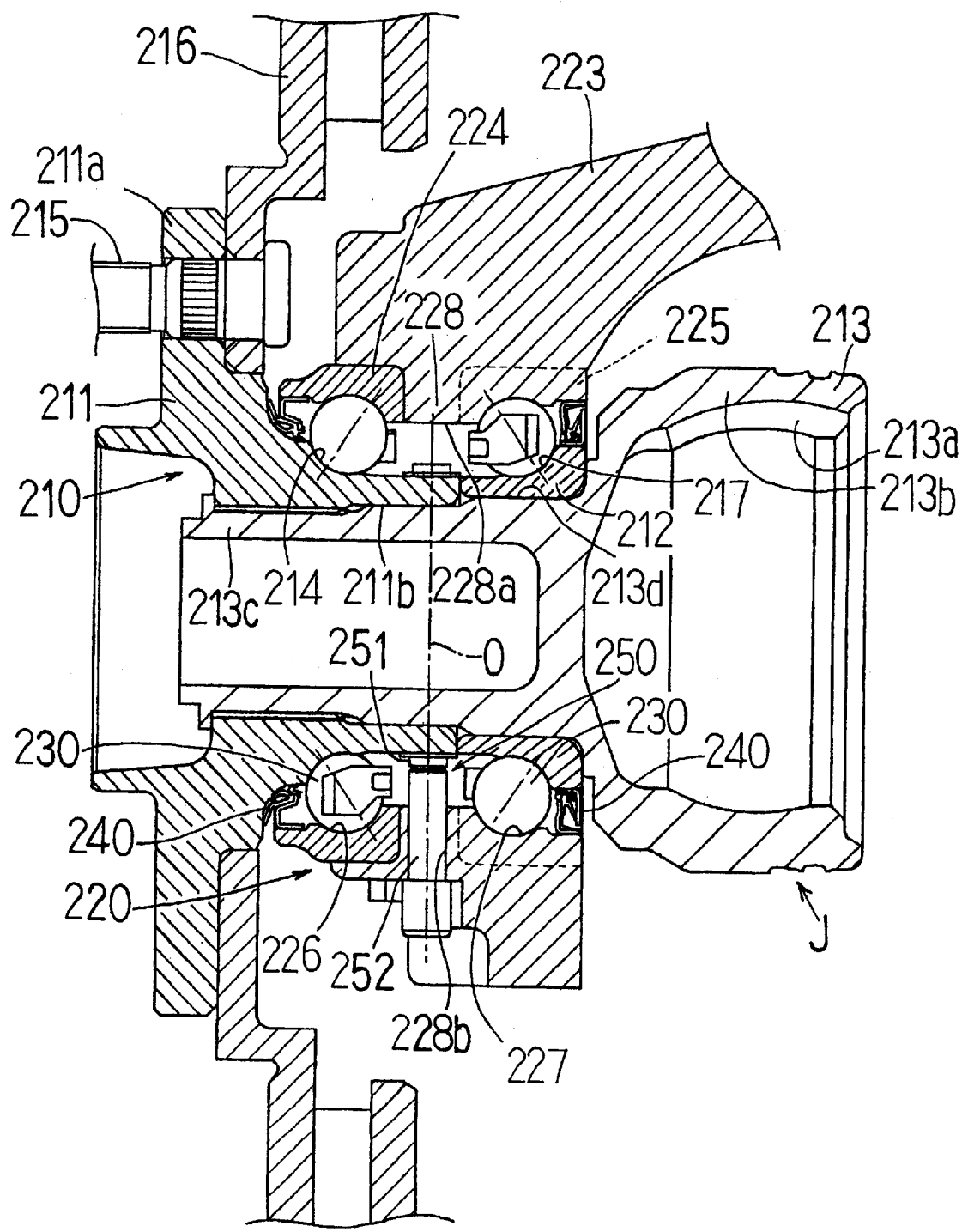
FIG. 18 is a sectional view similar to FIG. 15, showing a modification in which an outer ring and a knuckle is integrated.

FIG. 18 shows a modification wherein the inboard outer ring 225 appearing in FIG. 15 is integrated with the knuckle 223 as by casting or insert molding, in which case the inboard fixed raceway surface 227 is formed on the inner peripheral surface of the knuckle 223. The rest of the arrangement is the same as in FIG. 15, so that common parts and elements are marked with common reference numerals to omit a repetitive description thereof. In addition, though not shown, the outboard outer ring 224 may be integrated with the knuckle 223 by the same method or both outer rings 224 and 225 may be integrated with the knuckle 223.

Figure 21:
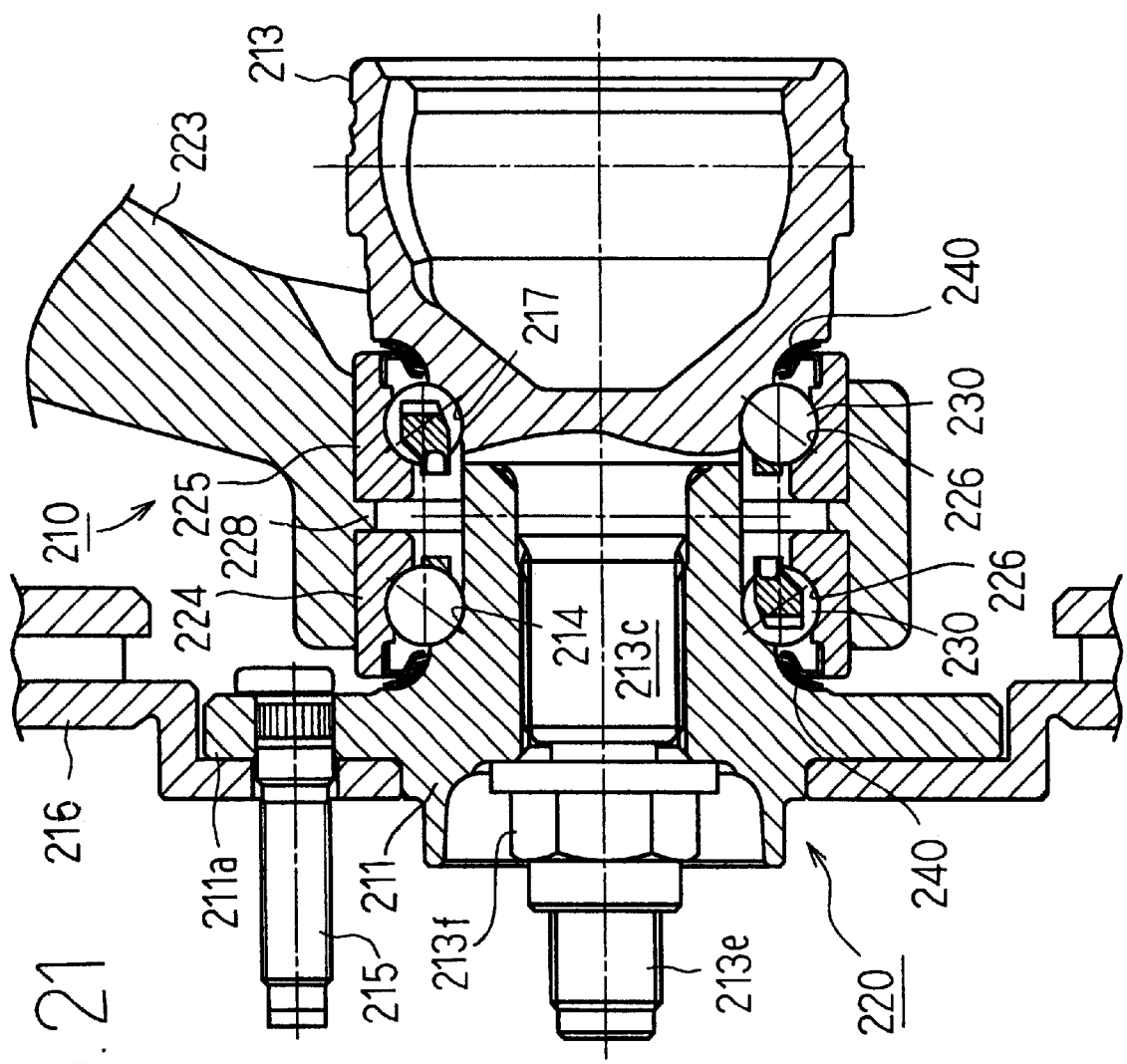
FIG. 21 is a sectional view similar to FIG. 15, showing a modification in which the hub and the outer joint member are separably fastened.

FIG. 21 shows a modification in which the joining construction between the hub ring 211 and the outer joint member 213 are modified (illustration of the wheel rpm detection means 250 being omitted.) Specifically, the hub ring 211 and the outer joint member 213 are separably joined with a nut 213f in engagement with threaded portion 213e formed on an end of the stem 213c of the outer joint member 213. In this case, a pair of outer rings 224 and 225 are positioned on opposite sides of the flange 228 of the knuckle 223, so that untightening and removing the nut 213f allows the hub ring 211 with the outboard outer ring 224 and the outer joint member 213 with the inboard outer ring 225 to be detached from the knuckle 223, independently from each other. Accordingly, if either the bearing part or the joint part has been damaged, e.g. by flaking, and should be repaired, the particular one alone can be detached for repair.

Although in FIG. 21, the brake rotor 216 is positioned on the outside, i.e. on the left-hand side as viewed in the Figure, of the wheel attaching flange 211a, it may be positioned on the inside, i.e. on the right-hand side as viewed in the Figure, of the flange 211a. Similarly, in FIGS. 15–18, the brake rotor 216 may be positioned on the outside, i.e. on the left-hand side as viewed in the Figures, of the flange 211a.

In the above description, a wheel bearing device for driving wheels in which the outer joint member 213 of a constant velocity joint J is connected to the hub ring 211 has been shown by way of example; however, the present invention is likewise applicable to a wheel bearing device for driven wheels in which the outer joint member is not connected.

What is claimed is:

1. A wheel bearing device comprising a fixed member attached to a car body, an outer member fitted in said fixed member and formed with a double row of raceway surfaces on its inner periphery, an inner member formed with a double row of raceway surfaces on its outer peripheral surface opposed to the raceway surfaces of said outer member and having a wheel attaching flange, a double row of rolling bodies interposed between the raceway surfaces of said outer and inner members, the wheel being rotatably supported by the car body, said wheel bearing device being characterized in that an rpm detecting sensor is fitted in a hole formed to extend radially through said fixed and outer members and is opposed to a sensed part disposed between the raceway surfaces of said inner member.

2. A wheel bearing device as set forth in claim 1, characterized in that said sensor is fitted in the holes in the fixed and outer members through a cylindrical member.

3. A wheel bearing device as set forth in claim 1, characterized in that a pin-like member is fitted in a hole formed to extend radially through said fixed and outer members.

4. A wheel bearing device as set forth in claim 3, characterized in that said pin-like member is fitted in the hole in the fixed member through an elastic member so that it can be projected and retracted.

5. A wheel bearing device as set forth in claim 1, characterized in that a pin-like member is fitted in a hole formed to extend radially through said fixed member and is engaged in an annular groove formed in the outer surface of said outer member.

6. A wheel bearing device as set forth in claim 1, characterized in that the inner surface of said fixed member and the outer surface of said outer member are each formed with an annular groove, and a locking member is installed that bites into said annular grooves.

7. A wheel bearing device as set forth in claim 6, characterized in that said locking member is in the form of a diametrically contractible end-having snap ring having elastic recovery force.

8. A wheel bearing device as set forth in claim 7, characterized in that said snap ring is made circumferentially uneven.

9. A wheel bearing device as set forth in claim 1, characterized in that the inner surface of said fixed member and the outer surface of said outer member are each formed with an annular groove, a tangential hole communicating with said annular grooves is formed in the fixed member, and a locking member is installed that is inserted from said tangential hole and bites into said annular grooves.

10. A wheel hearing device as set forth in claim 9, characterized in that said locking member is a wire or bearing steel ball inserted from the tangential hole communicating with the annular groove of the fixed member.

* * * * *